US012517217B2

(12) United States Patent
Lao et al.

(10) Patent No.: US 12,517,217 B2
(45) Date of Patent: Jan. 6, 2026

(54) RADAR SIGNAL TRANSMITTING METHOD, RADAR SIGNAL RECEIVING METHOD, AND APPARATUS

(71) Applicant: Shenzhen Yinwang Intelligent Technologies Co., Ltd., Shenzhen (CN)

(72) Inventors: Dapeng Lao, Beijing (CN); Jinnan Liu, Shenzhen (CN); Rongjiang Liu, Beijing (CN); Chen Yang, Beijing (CN); Jintai Zhu, Beijing (CN); Dejian Li, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 477 days.

(21) Appl. No.: 18/071,333

(22) Filed: Nov. 29, 2022

(65) Prior Publication Data

US 2023/0092131 A1 Mar. 23, 2023

Related U.S. Application Data

(63) Continuation of application No. PCT/CN2020/093630, filed on May 30, 2020.

(51) Int. Cl.
*G01S 7/35* (2006.01)
*G01S 7/02* (2006.01)
(Continued)

(52) U.S. Cl.
CPC ............... *G01S 7/35* (2013.01); *G01S 13/34* (2013.01); *G01S 7/02* (2013.01);
(Continued)

(58) Field of Classification Search
CPC .......... G01S 7/35; G01S 13/34; G01S 13/931; G01S 2013/0263; G01S 13/325; G01S 13/42; G01S 13/584; G01S 7/02
See application file for complete search history.

(56) References Cited

U.S. PATENT DOCUMENTS 8,909,174 B2 * 12/2014 Howard ............... H04B 7/0626
375/267
2016/0131752 A1 5/2016 Jansen et al.
(Continued)

FOREIGN PATENT DOCUMENTS

CN 1278375 A 12/2000
CN 101409422 A 4/2009
(Continued)

OTHER PUBLICATIONS

Jansen "Automotive Radar Doppler Division MIMO With Velocity Ambiguity Resolving Capabilities," Proceedings of the 16th European Radar Conference, Paris, France, pp. 245-248, Institute of Electrical and Electronics Engineers, New York, New York (Oct. 2-4, 2019).
(Continued)

*Primary Examiner* — William Kelleher
*Assistant Examiner* — Ismaaeel A. Siddiquee
(74) *Attorney, Agent, or Firm* — Leydig, Voit & Mayer, Ltd.

(57) ABSTRACT

A radar signal transmitting method, a radar signal receiving method, and an apparatus applied to a radar apparatus are provided. The radar signal transmitting method includes: sending a first signal and a second signal in S slots, wherein a phase of the first signal remains unchanged in the S slots, and the first signal may be equivalent to a SIMO signal; and sending the second signal in at least one of a time division manner or a code division manner, wherein phase modulation is performed, by using a step of $2\pi k_s/P$, on a signal that is in the second signal and that is sent through each of m transmit antennas, and the second signal is equivalent to a MIMO signal. When P=2, the MIMO signal is sent in a time division manner. When P>2, the MIMO signal is sent in a time division manner and a code division manner.

21 Claims, 18 Drawing Sheets

(51) Int. Cl.

| | |
|---|---|
| *G01S 13/02* | (2006.01) |
| *G01S 13/32* | (2006.01) |
| *G01S 13/34* | (2006.01) |
| *G01S 13/42* | (2006.01) |
| *G01S 13/58* | (2006.01) |
| *G01S 13/931* | (2020.01) |

(52) U.S. Cl.
CPC ..... *G01S 2013/0263* (2013.01); *G01S 13/325* (2013.01); *G01S 13/42* (2013.01); *G01S 13/584* (2013.01); *G01S 13/931* (2013.01)

(56) References Cited

U.S. PATENT DOCUMENTS

| | | |
|---|---|---|
| 2018/0252809 A1 | 9/2018 | Davis et al. |
| 2020/0081110 A1 | 3/2020 | Nam et al. |
| 2020/0191940 A1* | 6/2020 | Wu ........................ G01S 13/931 |
| 2022/0171050 A1* | 6/2022 | Liu ......................... G01S 7/006 |
| 2022/0221569 A1* | 7/2022 | Wang ..................... G01S 13/343 |
| 2023/0092131 A1 | 3/2023 | Lao et al. |

FOREIGN PATENT DOCUMENTS

| | | |
|---|---|---|
| CN | 102362439 A | 2/2012 |
| CN | 105264400 A | 1/2016 |
| CN | 107707498 A | 2/2018 |
| CN | 109541627 A | 3/2019 |
| CN | 110168400 A | 8/2019 |
| CN | 110888122 A | 3/2020 |
| EP | 4148451 A4 | 6/2023 |
| JP | 2016050778 A | 4/2016 |
| JP | 2019128234 A | 8/2019 |
| JP | 2019128235 A | 8/2019 |
| JP | 2019522220 A | 8/2019 |
| WO | 2014045096 A1 | 3/2014 |
| WO | 2017175190 A1 | 10/2017 |
| WO | 2021243491 A1 | 12/2021 |

OTHER PUBLICATIONS

Sturm et al., "Automotive Fast-Chirp MIMO Radar with Simultaneous Transmission in a Doppler-Multiplex," The 19th International Radar Symposium IRS 2018, Bonn, Germany, pp. 1-6, Institute of Electrical and Electronics Engineers, New York, New York (Jun. 20-22, 2018).

* cited by examiner

RADAR SIGNAL TRANSMITTING METHOD, RADAR SIGNAL RECEIVING METHOD, AND APPARATUS

CROSS-REFERENCE TO RELATED APPLICATIONS

This application is a continuation of International Application No. PCT/CN2020/093630, filed on May 30, 2020, which is hereby incorporated by reference in its entirety.

TECHNICAL FIELD

Embodiments of this this application relate to the field of radar technologies, and in particular, to a radar signal transmitting method, a radar signal receiving method, and an apparatus.

BACKGROUND

A vehicle-mounted radar is an indispensable sensor in an automated driving system. A vehicle may be provided with obstacle (which may also be referred to as a target) detection by using the vehicle-mounted radar. Specifically, the vehicle-mounted radar may send a frequency modulated continuous wave (FMCW), and measure a distance, a speed, and an azimuth of an obstacle by detecting a reflected echo of the obstacle.

In recent years, a vehicle-mounted radar technology continuously evolves, and performance of a vehicle-mounted radar continuously improves, which may be specifically reflected in the following aspects: A frequency band gradually evolves from 24 GHz to 77 GHz/79 GHz, to obtain higher range resolution through higher scanning bandwidth. A chirp scanning period is reduced from several ms to μs in terms of a waveform, so that a measurement distance is decoupled from a measurement speed, to reduce a probability of false targets. A quantity of channels evolves from a single-input multiple-output (SIMO) mode to a multiple-input multiple-output (MIMO) mode, and an antenna scale continuously increases, so that a virtual antenna aperture is enlarged, to improve angle resolution, and meet a requirement of autonomous driving for higher spatial resolution of a target. Because signals of a plurality of transmit antennas need to be separated to obtain a target angle, orthogonal waveforms of the plurality of transmit antennas need to be designed.

A plurality of transmit antennas of a MIMO radar may send a chirp signal in a time division multiplexing (TDM) manner, to enlarge a virtual antenna aperture, that is, to implement a TDM MIMO waveform. However, in the TDM MIMO waveform, a maximum speed measurement range Vmax_MIMO decreases, and Vmax_MIMO=Vmax_SIMO/Ntx, where Ntx is a quantity of transmit antennas.

Alternatively, signals of a plurality of transmit antennas may be simultaneously transmitted in a code division multiple (CDM) manner. CDM is also referred to as Doppler division multiplexing (DDM) or Doppler division multiple access (DDMA) in some documents. In the document "Automotive Fast-Chirp MIMO Radar with Simultaneous Transmission in a Doppler-Multiplex, the 19th International Radar Symposium IRS, 2018", a MIMO radar with two transmit antennas is implemented by using a binary phase. In the document "Automotive Radar Doppler Division MIMO With Velocity Ambiguity Resolving Capabilities, 16th European Radar Conference (EuRAD), 2019", simultaneous transmission of three transmit antennas is implemented by using a binary phase. The two manners are limited by precise control of a phase shifter in a chip on a signal phase, and therefore cannot implement orthogonal transmission of more antennas. As a result, requirements for both a speed measurement range and angle resolution cannot be met.

SUMMARY

An objective of this application is to provide a radar signal transmitting method, a radar signal receiving method, and an apparatus, so as to overcome a problem in the conventional technology that an orthogonal waveform sent by a radar apparatus cannot meet requirements for both a speed measurement range and angle resolution.

According to a first aspect, this application provides a radar signal transmitting method, applied to a radar apparatus. The radar apparatus includes N transmit antennas, N is an integer greater than 2, and m is an integer greater than or equal to 2 and less than N. The method includes: sending both a first signal and a second signal in S slots, where the first signal is sent through one of the N transmit antennas, and a phase of the first signal remains unchanged in the S slots; and the second signal is sent in the S slots through m transmit antennas in the N transmit antennas in at least one of a time division manner or a code division manner, and phase modulation is performed, by using a step of $2\pi k_y/P$, on a signal that is in the second signal and that is sent through each of the m transmit antennas, where P is an integer greater than 1, $k_y$ is an integer greater than 0 and less than P, $k_y$ represents a phase modulation step used by a $y^{th}$ transmit antenna in the m transmit antennas, and y=1, ..., or m.

In the foregoing method, because the first signal includes only a signal of one transmit antenna and occupies S consecutive slots, the first signal may be a SIMO signal. An advantage of the first signal is that a speed measurement range is large. The second signal includes signals sent through the m transmit antennas, and therefore may be understood as a MIMO signal. An advantage of the second signal is that measured angle resolution is high. Both the large speed measurement range and high angle resolution can be obtained by transmitting the first signal and the second signal in at least one of the time division manner or the code division manner.

In a possible design, S may have a value range, that is, $(Nd+1)*P*M>S>=Nd*P*M$, where Nd represents a quantity of repetition times of transmission patterns of the m transmit antennas, and Nd is greater than or equal to 1. The transmission pattern indicates that a signal of a transmit antenna using a time division manner occupies P non-conflicting slots at an interval of M slots, where M is a quantity of slots separated between adjacent slots in slots occupied by one of the m transmit antennas, and M is an integer greater than or equal to m/(P−1). The transmission pattern may indicate a relationship between a modulated phase and a modulated amplitude of a signal in P*M slots. It can be learned from value ranges of P, Nd, and M, that is, P=2, m=2, M=m/(P−1)=2, and Nd=1, that a minimum value of S may be 4.

In the foregoing method, because speed resolution for measuring a speed of a target is $\lambda/(2*S*Tchip)$, which is inversely proportional to a value of S, a larger value S indicates lower speed resolution and a more accurate speed for obtaining the target. λ is a wavelength of a modulation frequency, and Tchip is duration of a slot.

In a possible design, values of $k_y$ are different when phase modulation is performed, by using a step of $2\pi k_y/P$, on signals sent through transmit antennas that occupy a same slot in the m transmit antennas. For example, one transmit antenna performs phase modulation by using a step of $2\pi/P$, and the other transmit antenna performs phase modulation by using a step of $4\pi/P$.

In the foregoing method, the transmit antennas that occupy the same slot perform phase modulation by using different steps, so that signals sent through different transmit antennas can be distinguished based on phases, to improve target detection accuracy.

In a possible design, P phases are generated by a phase shifter including phases $[0, 2\pi/P, 4\pi/P, 6\pi/P, \ldots, (P-1)*2\pi/P]$.

In a possible design, a third signal may be further sent in S0 slots after the S slots through the m transmit antennas in a time division manner, where S0 is an integer greater than 1. A waveform of the third signal is the same as a waveform of the second signal, that is, a transmission pattern of the third signal in the S0 slots is the same as a transmission pattern of the second signal in the S slots, where $S=Nd*P*M$, and M is an integer greater than or equal to $m/(P-1)$.

In the foregoing method, the third signal in the S0 slots is sent after the first signal, so that a speed of a target and a Doppler phase corresponding to the speed of the target can be obtained based on speed resolution of the first signal.

In a possible design, sending the second signal in the S slots through m transmit antennas in the N transmit antennas in at least one of a time division manner or a code division manner includes: in first S1 slots in the S slots, separately sending the second signal through N1 transmit antennas in the m transmit antennas by using P*M1 slots as a period and by selecting P non-conflicting slots at an interval of M1 from P*M1 slots in one period; and in last S2 slots in the S slots, separately sending the second signal through N2 transmit antennas other than the N1 transmit antennas in the m transmit antennas by using P*M2 slots as a period and by selecting P non-conflicting slots at an interval of M2 from P*M2 slots in one period, where $m=N1+N2$, $N1>=2$, $N2>=1$, $S=S1+S2$, $M1 \neq M2$, $M1>=N1/(P-1)$, and $M2>=N2/(P-1)$.

In the foregoing method, because configured M1 and M2 are different, maximum speed measurement ranges are different. Two targets whose speeds are aliased in echoes at an interval of M1 can be easily distinguished in echoes at an interval of M2. Conversely, two targets whose speeds are aliased in echoes at an interval of M2 can be easily distinguished in echoes at an interval of M1. Therefore, different slot intervals M1 and M2 are set to make it easier to determine an actual quantity of targets and avoid missing a target whose reflected echo is weak.

In a possible design, a signal waveform of the first signal in the S slots may be an FMCW, and a signal waveform of the second signal in the S slots may also be an FMCW. Alternatively, another waveform used by a MIMO radar may be used, for example, may be a pulse waveform or an orthogonal frequency division multiplexing (OFDM) waveform.

In a possible design, P=2, 3 or 4.

In the foregoing method, different phase modulation and coding is used for the first signal and the second signal, and only phases whose quantity is less than or equal to 4 are used. Therefore, a requirement on precision of a phase modulator is reduced, and a requirement on a chip is reduced.

In a possible design, an intersection of the m transmit antennas that send the second signal and the one transmit antenna that sends the first signal is 0, that is, the m transmit antennas that send the second signal and the one transmit antenna that sends the first signal are different transmit antennas in the N transmit antennas.

According to a second aspect, this application provides a radar signal receiving method, applied to a radar apparatus. The radar apparatus includes N transmit antennas and at least one receive antenna, where m is an integer greater than or equal to 2 and less than N, and N is an integer greater than 2. The method includes: obtaining M sub-range-Doppler RD maps of each of the at least one receive antenna; and detecting a first target based on a sub-RD map obtained after the M sub-RD maps of each receive antenna are accumulated, and obtaining range information of the first target, where the first target is one or more of at least one target. An $i^{th}$ sub-RD map in the M sub-RD maps of each receive antenna is a result of performing two-dimensional fast Fourier transform 2D-FFT on signals at an interval of M slots that are in echo signals of the receive antenna in S slots and whose start slots are respectively i, i is set to any integer of $1, 2, \ldots,$ and M, and the echo signal is formed after a first signal and a second signal are reflected by the at least one target; the first signal is sent in the S slots through one of the N transmit antennas, and a phase of the first signal remains unchanged in the S slots; the second signal is sent in the S slots through m transmit antennas in the N transmit antennas in at least one of a time division manner and a code division manner; and phase modulation is performed, by using a step of $2\pi k_y/P$, on a signal that is in the second signal and that is sent through each of the m transmit antennas, where P is an integer greater than 1, $k_y$ is an integer greater than 0 and less than P, $k_y$ represents a phase modulation step used by a $y^{th}$ transmit antenna in the m transmit antennas, and $y=1, \ldots,$ or m.

In the conventional technology, Doppler spectral lines of an aliased speed of a target are detected by using a total RD map, and $(P-1)*M+1$ Doppler spectral lines need to be matched. In the foregoing method, one target is detected by using the sub-RD map obtained after the accumulation. Because a same target corresponds to only P Doppler spectral lines, which is far less than a quantity of corresponding Doppler spectral lines when detection is performed by using the total RD map, it is easier to detect Doppler spectral lines of an aliased speed of a target by using the sub-RD map than by using the total RD map.

It should be noted that an RD map is a radar output graph in which one dimension is range information and the other dimension is Doppler information. The RD map is referred to as a range bin in terms of a range dimension, is referred to as a Doppler bin in terms of a Doppler dimension, and is referred to as a range-Doppler cell in terms of both a range dimension and a Doppler dimension.

In a possible design, a total RD map may be further obtained, and the total RD map may be a result of performing two-dimensional FFT (2D-FFT) in all adjacent slots in the S slots.

In a possible design, the method further includes: determining at least one Doppler index Vind_sub of an aliased speed of a first signal of the first target on the sub-RD map obtained after the accumulation, where the at least one Doppler index Vind_sub of the aliased speed of the first signal of the first target on the sub-RD map obtained after the accumulation is located at P possible locations at an interval of Nfft/P, and Nfft is a dimension of 2D-FFT of the sub-RD map obtained after the accumulation.

In a possible design, the method further includes: matching the sub-RD map obtained after the accumulation and the total RD map to determine at least one Doppler index Vind_total of a non-aliased speed of the first target and at least one Doppler index Vind_sub of an aliased speed corresponding to the first target on the sub-RD map obtained after the accumulation.

In a possible design, the method further includes: compensating for a Doppler phase deviation caused by time division of the m transmit antennas and a phase deviation caused by code division of the m transmit antennas, and obtaining angle information of the first target. Accurate angle information can be obtained by compensating for the phase deviation.

According to a third aspect, a radar apparatus is provided. The radar apparatus includes an antenna array, a processor, and a microwave integrated circuit, and the antenna array includes N transmit antennas, where N is an integer greater than 2.

The processor is configured to determine the first signal and the second signal in any possible design of the first aspect.

The microwave integrated circuit is configured to generate the first signal and the second signal that are determined by the processor.

The antenna array is configured to send the first signal and the second signal that are generated by the microwave integrated circuit.

According to a fourth aspect, a radar apparatus is provided. The radar apparatus includes a receiver and a processor, and the receiver includes at least one receive antenna.

The receiver is configured to receive the echo signal in any possible design of the second aspect.

The processor is configured to perform the method in any possible design of the second aspect based on the echo signal.

According to a fifth aspect, a radar apparatus is provided, and includes a memory and a processor. The memory is configured to store instructions, the processor is configured to execute the instructions stored in the memory, and when executing the instructions stored in the memory, the processor is configured to generate the first signal and the second signal in any possible design of the first aspect.

According to a sixth aspect, a radar apparatus is provided, and includes a memory and a processor. The memory is configured to store instructions, the processor is configured to execute the instructions stored in the memory, and when executing the instructions stored in the memory, the processor is configured to perform the method in any possible design of the second aspect.

According to a seventh aspect, a readable storage medium is provided, and includes a computer program or instructions. When the computer program or the instructions are executed, the method in any possible design of the first aspect or the second aspect is performed.

According to an eighth aspect, a computer program product is provided, and includes computer-readable instructions. When a radar apparatus reads and executes the computer-readable instructions, the radar apparatus is enabled to perform the method in any possible design of the first aspect or the second aspect.

DESCRIPTION OF EMBODIMENTS

The following further describes in detail embodiments of this application with reference to the accompanying drawings.

Figure 1A:
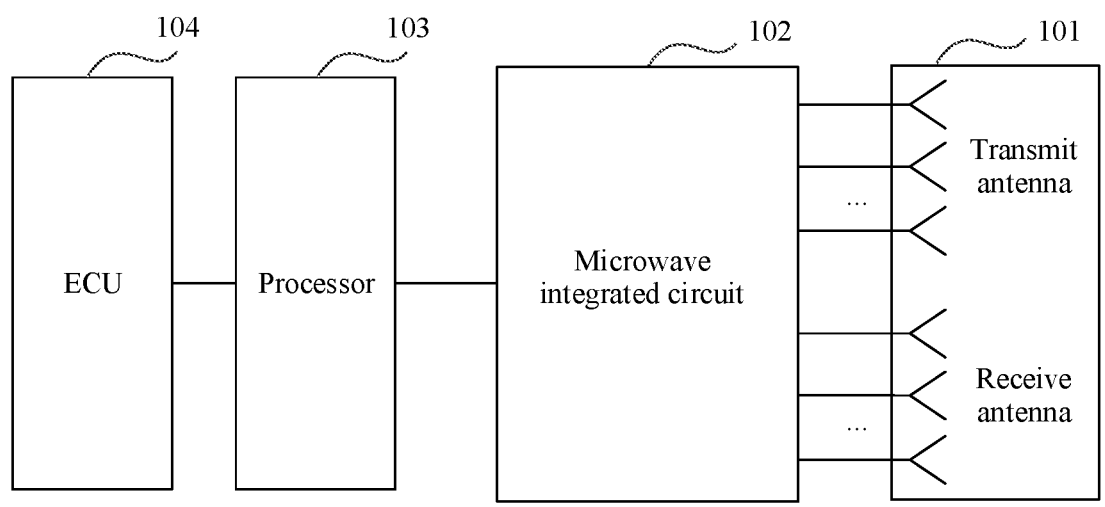
FIG. 1(a) and FIG. 1(b) are a schematic diagram of a structure of a radar apparatus to which an embodiment of this application is applicable.

FIG. 1(a) is a schematic diagram of a radar apparatus according to an embodiment of this application. The radar apparatus in FIG. 1(a) may be a MIMO radar, and may include an antenna array 101, a microwave integrated circuit (monolithic microwave integrated circuit, MMIC) 102, and a processor 103. The antenna array 101 may include a plurality of transmit antennas and a plurality of receive antennas.

The microwave integrated circuit 102 is configured to: generate a radar signal, and further send the radar signal through one or more transmit antennas in a transmit antenna array in the antenna array 101. It should be noted that, in this embodiment of this application, a waveform of a signal sent through a transmit antenna of the radar apparatus is an FMCW, and a frequency of the signal is modulated by enabling a signal frequency to rise and fall with time. This signal usually includes one or more "chirp signals". One slot may be represented as an occupation time of transmitting one chirp signal through a single transmit antenna, and $T_{SIMO}=T_{ramp}+T_{other}$, where $T_{ramp}$ represents a time of a frequency sweep signal actually used for measurement, and $T_{other}$ represents an additional time overhead introduced by an actual component such as an analog-to-digital converter (ADC) or a phase locked loop (PLL). It may be understood that, because time division and phase modulation technologies are used in this application, a radio frequency link of each transmit antenna in the radar apparatus further includes a switch and a phase shifter.

Figure 1B:
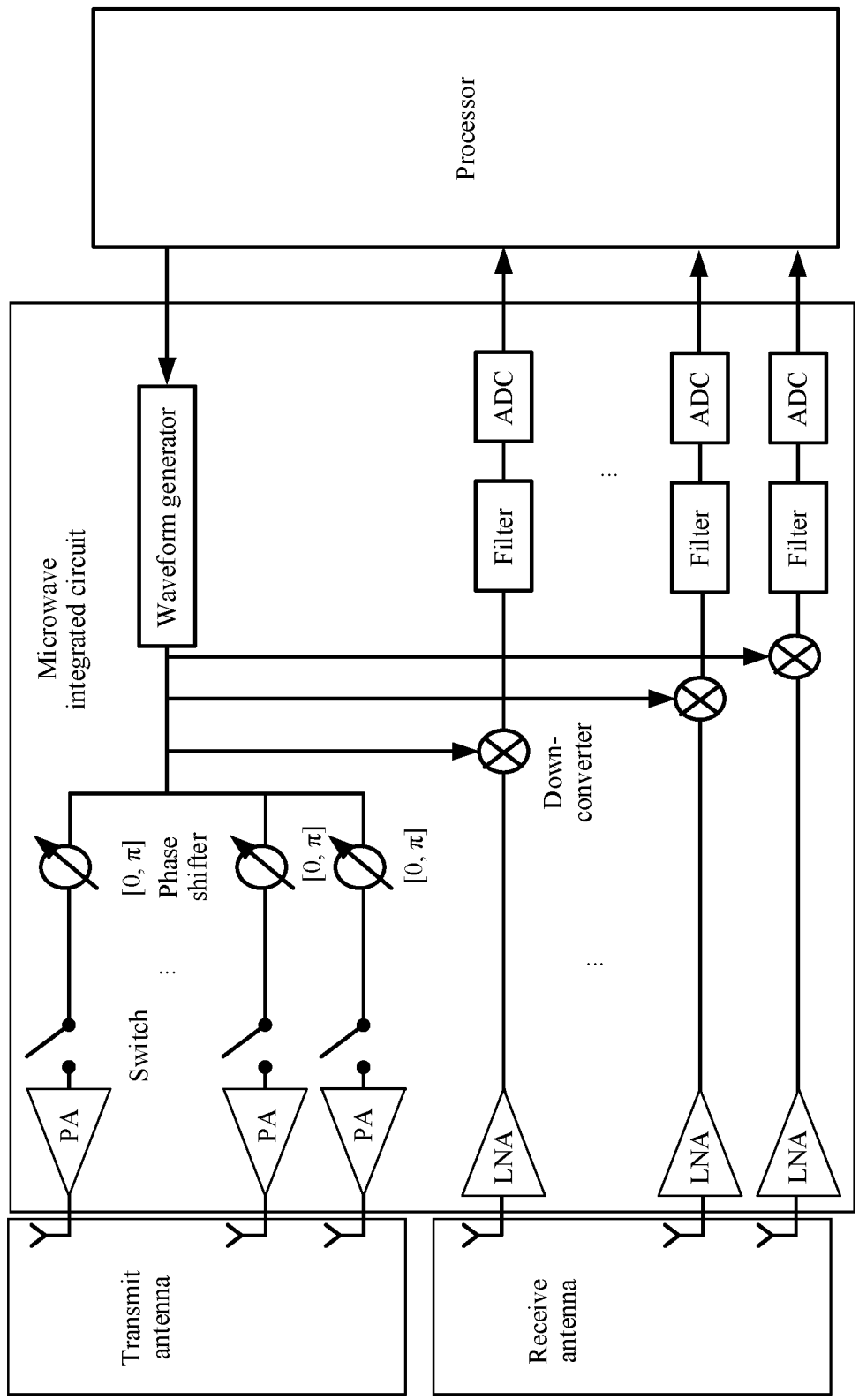

For example, FIG. 1(b) is a schematic diagram of a microwave integrated circuit according to an embodiment of this application. In FIG. 1(b), the microwave integrated circuit may include one or more radio frequency receive channels and radio frequency transmit channels. The radio frequency transmit channel may include modules such as a waveform generator, a phase shifter, a switch, and a power amplifier (PA). The radio frequency receive channel may include modules such as a low noise amplifier (LNA), a down mixer, a filter, and an analog-to-digital converter (ADC).

FIG. 1(b) is merely an example, and the microwave integrated circuit may alternatively be in another form. This is not limited in this embodiment of this application.

Before transmitting a radar signal, a processor implements a configured waveform of the radar signal by using the waveform generator in the radio frequency transmit channel. In this embodiment of this application, orthogonal transmit waveforms of a plurality of transmit antennas may be pre-configured by the processor, are not limited to a name of the processor, and only indicate a function of implementing the pre-configured waveform. In this embodiment of this application, the radar signal may be sent in different transmit antennas in a time division manner. Therefore, a transmit antenna that needs to send the radar signal may be gated by using a switch. In addition, the radar signal may be sent in different transmit antennas in a code division manner, and a corresponding phase is modulated by using a phase shifter connected to the transmit antenna. The switch and the phase shifter are serially connected to an antenna and a waveform transmitter, but a sequence of the switch and the phase shifter may be changed.

After the radar signal is sent, an echo signal is formed after the radar signal is reflected by one or more targets, and the echo signal is received by a receive antenna. The microwave integrated circuit 102 is further configured to: perform processing such as frequency mixing and sampling on echo signals received on some or all receive antennas in a receive antenna array in the antenna array 101, and transmit sampled echo signals to the processor 103.

The processor 103 is configured to perform operations such as fast Fourier transform (FFT) and signal processing on the echo signal, to determine information such as a distance, a speed, and an angle of a target based on the received echo signal. Specifically, the processor 103 may be a device having a processing function, such as a microprocessor (microcontroller unit, MCU), a central processing unit (CPU), a digital signal processor (DSP), a field-programmable gate array (FPGA), or a dedicated accelerator.

In addition, the radar system shown in FIG. 1(a) may further include an electronic control unit (ECU) 104, configured to control a vehicle based on the information such as the distance, the speed, and the angle of the target that are obtained after processing by the processor 103, for example, determine a moving route of the vehicle and control a speed of the vehicle.

In this embodiment of this application, a transmitter may include a transmit antenna and a transmit channel in the microwave integrated circuit 102, and a receiver includes a receive antenna and a receive channel in the microwave integrated circuit 102. The transmit antenna and the receive antenna may be located on a printed circuit board (PCB), and the transmit channel and the receive channel may be located in a chip, that is, AOB (antenna on PCB). Alternatively, the transmit antenna and the receive antenna may be located in a chip package, and the transmit channel and the receive channel may be located in a chip, that is, an antenna in package (AIP). A combination form is not specifically limited in this embodiment of this application. It should be understood that specific structures of the transmit channel and the receive channel are not limited in this embodiment of this application, provided that corresponding transmit and receive functions can be implemented.

In addition, because a quantity of channels of a single microwave integrated circuit (radio frequency chip) is limited, when a quantity of transmit and receive channels required by the system is greater than that of the single radio frequency chip, a plurality of radio frequency chips need to be cascaded. Therefore, the entire radar system may include a plurality of cascaded radio frequency chips. For example, a transmit antenna array and a receive antenna array are obtained by cascading a plurality of pieces of MIMO, and an analog digital converter (ADC) channel is connected through an interface to output data to the processor 103, for example, an MCU, a DSP, an FPGA, or a general process unit (GPU). For another example, the MMIC and the DSP may be integrated into one chip to form a system on chip (SOC). For another example, the MMIC, the ADC, and the processor 103 may be integrated into one chip to form an SOC. In addition, one or more radar systems may be installed on the entire vehicle and connected to a central processing unit through a vehicle-mounted bus. The central processing unit controls one or more vehicle-mounted sensors, including one or more millimeter-wave radar sensors.

The following describes an application scenario in embodiments of this application.

Figure 2:
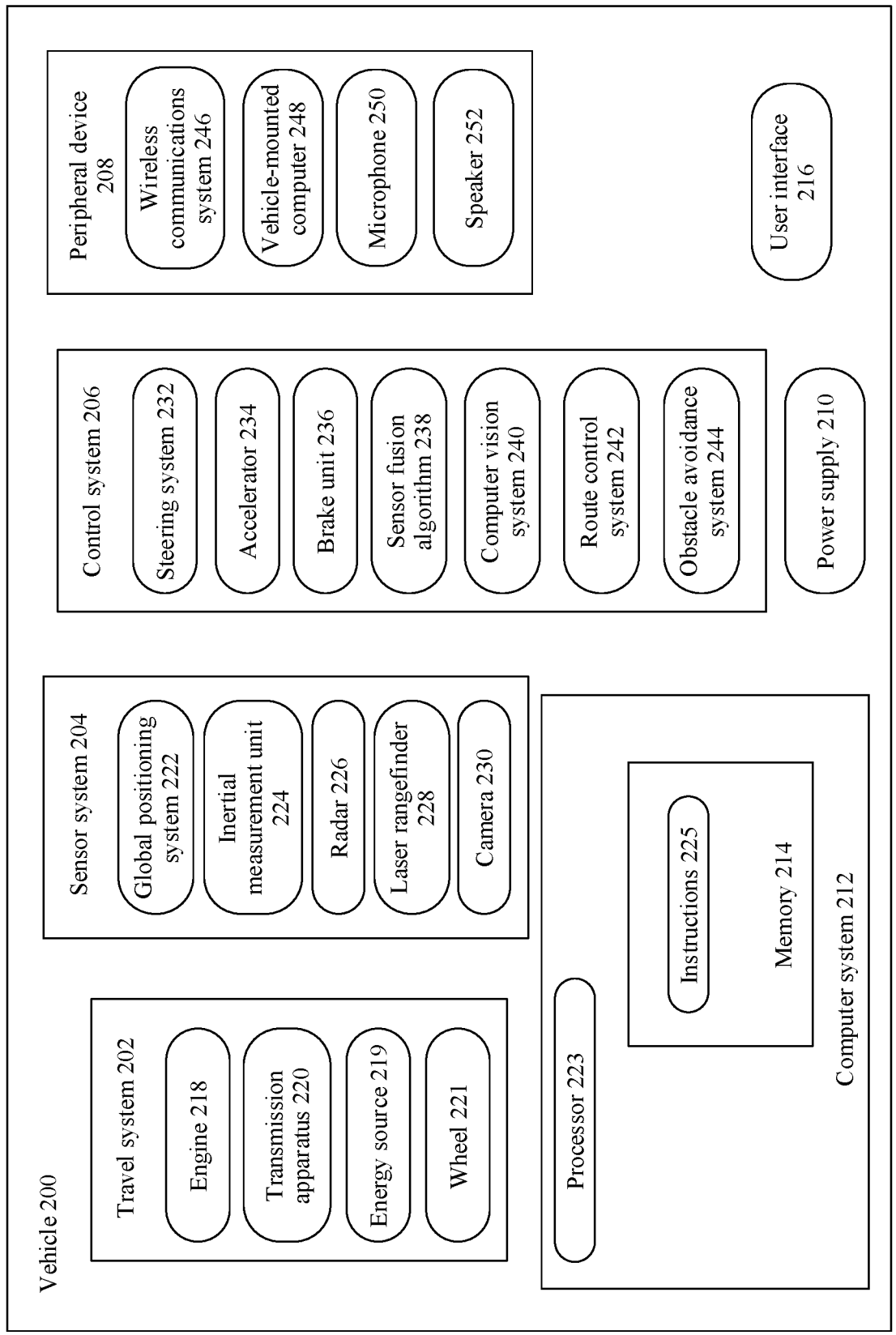
FIG. 2 is a schematic diagram of a structure of a vehicle according to an embodiment of this application.

The radar apparatus shown in FIG. 1(a) may be applied to a vehicle with an autonomous driving function. FIG. 2 is a functional block diagram of a vehicle 200 with an autonomous driving function according to an embodiment of this application. In an embodiment, the vehicle 200 is configured to be in a fully or partially autonomous driving mode. For example, the vehicle 200 in an autonomous driving mode may control the vehicle 200, and may determine current statuses of the vehicle and an ambient environment of the vehicle through a manual operation, determine possible behavior of at least one another vehicle in the ambient environment, determine a confidence level corresponding to a possibility that the another vehicle performs the possible behavior, and control the vehicle 200 based on determined information. When the vehicle 200 is in the autonomous driving mode, the vehicle 200 may be set to operate without interacting with a person.

The vehicle 200 may include various subsystems, such as a travel system 202, a sensor system 204, a control system 206, one or more peripheral devices 208, a power supply 210, a computer system 212, and a user interface 216. Optionally, the vehicle 200 may include more or fewer subsystems, and each subsystem may include a plurality of components. In addition, each subsystem and component of the vehicle 200 may be interconnected in a wired or wireless manner.

The travel system 202 may include a component that provides power for the vehicle 200 to move. In an embodiment, the travel system 202 may include an engine 218, an energy source 219, a transmission apparatus 220, and a wheel/tire 221. The engine 218 may be an internal combustion engine, a motor, an air compression engine, or another type of engine combination, for example, a hybrid engine including a gasoline engine and a motor, or a hybrid engine including an internal combustion engine and an air compression engine. The engine 218 converts the energy source 219 into mechanical energy.

The energy source 219 includes, for example, gasoline, diesel, other oil-based fuels, propane, other compressed gas-based fuels, ethanol, solar panels, batteries, and other power sources. The energy source 219 may also provide energy for another system of the vehicle 200.

The transmission apparatus 220 may transmit mechanical power from the engine 218 to the wheel 221. The transmission apparatus 220 may include a gearbox, a differential, and a drive shaft. In an embodiment, the transmission apparatus 220 may further include another component, for example, a clutch. The drive shaft may include one or more shafts that may be coupled to one or more wheels 221.

The sensor system 204 may include several sensors that sense information about an ambient environment of the vehicle 200. For example, the sensor system 204 may include a positioning system 222 (the positioning system may be a global positioning system (GPS), or may be a BeiDou system or another positioning system), an inertial measurement unit (IMU) 224, a radar 226, a laser rangefinder 228, and a camera 230. The sensor system 204 may further include sensors (for example, an in-vehicle air quality monitor, a fuel gauge, and an oil temperature gauge) in an internal system of the monitored vehicle 200. Sensor data from one or more of these sensors can be used to detect an object and corresponding features (a location, a shape, a direction, a speed, and the like) of the object. Such detection and recognition are key functions of a safe operation of the vehicle 200.

The positioning system 222 may be configured to estimate a geographical location of the vehicle 200. The IMU 224 is configured to sense a location change and an orientation change of the vehicle 200 based on inertial acceleration. In an embodiment, the IMU 224 may be a combination of an accelerometer and a gyroscope.

The radar 226 may sense a target in the ambient environment of the vehicle 200 by using a radio signal. In some embodiments, in addition to sensing the target, the radar 226 may be further configured to sense a speed and/or a moving direction of the target. In a specific example, the radar 226 may be implemented as the radar apparatus shown in FIG. 1(a).

The laser rangefinder 228 may sense, by using a laser, a target in an environment in which the vehicle 100 is located. In some embodiments, the laser rangefinder 228 may include one or more laser sources, a laser scanner, one or more detectors, and another system component.

The camera 230 may be configured to capture a plurality of images of the ambient environment of the vehicle 200. The camera 230 may be a static camera or a video camera.

The control system 206 controls operations of the vehicle 200 and the components of the vehicle. The control system 206 may include various components, including a steering system 232, an accelerator 234, a brake unit 236, a sensor fusion algorithm 238, a computer vision system 240, a route control system 242, and an obstacle avoidance system 244.

The steering system 232 may operate to adjust a moving direction of the vehicle 200. For example, in an embodiment, the steering system 232 may be a steering wheel system.

The accelerator 234 is configured to: control an operating speed of the engine 218 and further control a speed of the vehicle 200.

The brake unit 236 is configured to control the vehicle 200 to decelerate. The brake unit 236 may use friction to reduce a rotational speed of the wheel 221. In another embodiment, the brake unit 236 may convert kinetic energy of the wheel 221 into a current. The brake unit 236 may alternatively use another form to reduce a rotational speed of the wheel 221, to control the speed of the vehicle 200.

The computer vision system 240 may operate to process and analyze an image captured by the camera 230, to recognize a target and/or a feature in the ambient environment of the vehicle 200. The target and/or the feature may include a traffic signal, a road boundary, and an obstacle. The computer vision system 240 may use a target recognition algorithm, a structure from motion (SFM) algorithm, video tracking, and another computer vision technology. In some embodiments, the computer vision system 240 may be configured to: draw a map for an environment, track a target, estimate a speed of the target, and the like.

The route control system 242 is configured to determine a travel route of the vehicle 200. In some embodiments, the route control system 142 may determine the travel route for the vehicle 200 based on data from the sensor 238, the GPS 222, and one or more predetermined maps.

The obstacle avoidance system 244 is configured to: identify, evaluate, and avoid or bypass a potential obstacle in the environment of the vehicle 200 in another manner.

Certainly, in an example, the control system 206 may add or alternatively include components other than those shown and described. Alternatively, the control system 206 may delete some of the foregoing components.

The vehicle 200 interacts with an external sensor, another vehicle, another computer system, or a user by using the peripheral device 208. The peripheral device 208 may include a wireless communications system 246, a vehicle-mounted computer 248, a microphone 250, and/or a speaker 252.

In some embodiments, the peripheral device 208 provides a means for the user of the vehicle 200 to interact with the user interface 216. For example, the vehicle-mounted computer 248 may provide information for the user of the vehicle 200. The user interface 216 may further operate the vehicle-mounted computer 248 to receive a user input. The vehicle-mounted computer 248 may perform operations through a touchscreen. In another case, the peripheral device 208 may provide a means for the vehicle 200 to communicate with another device located in the vehicle. For example, the microphone 250 may receive audio (for example, a voice command or another audio input) from the user of the vehicle 200. Similarly, the speaker 252 may output audio to the user of the vehicle 200.

The wireless communications system 246 may wirelessly communicate with one or more devices directly or through a communications network. For example, the wireless communications system 246 may use 3G cellular communication such as code division multiple access (CDMA), EVD0, or a global system for mobile communications (GSM)/general packet radio service (GPRS), 4G cellular communication such as long term evolution (LTE), or 5G cellular communication. The wireless communications system 246 may communicate with a wireless local area network (WLAN) through Wi-Fi. In some embodiments, the wireless communications system 246 may directly communicate with a device through an infrared link, Bluetooth, or ZigBee. Other wireless protocols, for example, various vehicle communications systems, such as the wireless communications system 246, may include one or more dedicated short range communications (DSRC) devices, and these devices may include public and/or private data communication between vehicles and/or roadside stations.

The power supply 210 may supply power to various components of the vehicle 200. In an embodiment, the power supply 210 may be a rechargeable lithium-ion or lead-acid battery. One or more battery packs of such a battery may be configured as the power supply to supply power to the components of the vehicle 200. In some embodiments, the power supply 210 and the energy source 219 may be implemented together, for example, in some pure electric vehicles.

Some or all functions of the vehicle 200 are controlled by the computer system 212. The computer system 212 may include at least one processor 223. The processor 223 executes instructions 225 stored in a non-transitory computer-readable medium such as a memory 214. The computer system 212 may alternatively be a plurality of computing devices that control an individual component or a subsystem of the vehicle 200 in a distributed manner.

The processor 223 may be any conventional processor, such as a commercially available central processing unit (CPU). Alternatively, the processor may be a dedicated device such as an application-specific integrated circuit (ASIC) or another hardware-based processor. Although FIG. 2 functionally illustrates the processor, the memory, and other components of the computer 210 in a same block, a person of ordinary skill in the art should understand that the processor, the computer, or the memory may actually include a plurality of processors, computers, or memories that may or may not be stored in a same physical housing. For example, the memory may be a hard disk drive, or another storage medium located in a housing different from that of the computer 210. Therefore, a reference to the processor or the computer is understood as including a reference to a set of processors, computers, or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation.

In some embodiments, the memory 214 may include the instructions 225 (for example, program logic), and the instructions 225 may be executed by the processor 223 to perform various functions of the vehicle 200, including the functions described above. The memory 214 may also include additional instructions, including instructions used to send data to, receive data from, interact with, and/or control one or more of the travel system 202, the sensor system 204, the control system 206, and the peripheral device 208.

In addition to the instructions 225, the memory 214 may further store data, such as a road map, route information, a location, a direction, a speed, and other vehicle data of the vehicle, and other information. Such information may be used by the vehicle 200 and the computer system 212 when the vehicle 200 operates in an autonomous mode, a semi-autonomous mode, and/or a manual mode.

The user interface 216 is configured to: provide information for or receive information from the user of the vehicle 200. Optionally, the user interface 216 may include one or more input/output devices within a set of peripheral devices 208, such as the wireless communications system 246, the vehicle-mounted computer 248, the microphone 250, and the speaker 252.

The computer system 212 may control functions of the vehicle 200 based on inputs received from various subsystems (for example, the travel system 202, the sensor system 204, and the control system 206) and from the user interface 216. For example, the computer system 212 may control the steering unit 232 by using an input from the control system 206, to avoid an obstacle detected by the sensor system 204 and the obstacle avoidance system 244. In some embodiments, the computer system 212 may operate to provide control on the vehicle 200 and the subsystems of the vehicle 200 in many aspects.

Optionally, one or more of the foregoing components may be installed separately from or associated with the vehicle 200. For example, the memory 214 may exist partially or completely separate from the vehicle 200. The foregoing components may be communicatively coupled together in a wired and/or wireless manner.

Optionally, the foregoing components are merely examples. In actual application, components in the foregoing modules may be added or deleted based on an actual requirement. FIG. 2 should not be understood as a limitation on this embodiment of this application.

An autonomous vehicle traveling on a road, for example, the vehicle 200, may recognize a target in an ambient environment of the autonomous vehicle, to determine to adjust a current speed. The target may be another vehicle, a traffic control device, or another type of target. In some examples, each recognized target may be considered independently, and based on features of each target, such as a current speed of the target, acceleration of the target, and a spacing between the target and the vehicle, may be used to determine the speed to be adjusted by the autonomous vehicle.

Optionally, the autonomous vehicle 200 or a computing device (for example, the computer system 212, the computer vision system 240, or the memory 214 in FIG. 2) associated with the autonomous vehicle 200 may predict behavior of the identified target based on a feature of the identified target and a status (for example, traffic, rain, and ice on a road) of the ambient environment. Optionally, all identified targets depend on behavior of each other, and therefore all the identified targets may be considered together to predict behavior of a single identified target. The vehicle 200 can adjust the speed of the vehicle 200 based on the predicted behavior of the identified target. In other words, the autonomous vehicle can determine, based on the predicted behavior of the target, a stable state to which the vehicle needs to be adjusted (for example, acceleration, deceleration, or stop). In this process, another factor may also be considered to determine the speed of the vehicle 200, for example, a horizontal location of the vehicle 200 on a road on which the vehicle travels, curvature of the road, and proximity between a static target and a dynamic target.

In addition to providing an instruction for adjusting the speed of the autonomous vehicle, the computing device may further provide an instruction for modifying a steering angle of the vehicle 200, so that the autonomous vehicle follows a given track and/or maintains safe lateral and longitudinal distances between the autonomous vehicle and a target (for example, a car in an adjacent lane on the road) near the autonomous vehicle.

The vehicle 200 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

In addition, it should also be noted that the radar system in this embodiment of this application may be applied to a plurality of fields. For example, the radar system in this embodiment of this application includes but is not limited to a vehicle-mounted radar, a roadside traffic radar, and a radar for an uncrewed aerial vehicle.

It should be noted that, in embodiments of this application, "a plurality of" means two or more. In addition, it should be understood that in the descriptions of this application, terms such as "first" and "second" are merely used for distinguishing, but should not be understood as indicating or implying relative importance, or should not be understood as indicating or implying a sequence.

With reference to the foregoing descriptions, this application provides a radar signal transmitting method and a radar signal receiving method. The method is applied to a radar apparatus. The radar apparatus includes N transmit antennas, where N>m, and m is an integer greater than or equal to 2. It should be understood that a specific structure of the radar apparatus may be shown in FIG. 1(a), or may not be limited to the specific structure in FIG. 1(a). This is not limited in this application.

Figure 3:
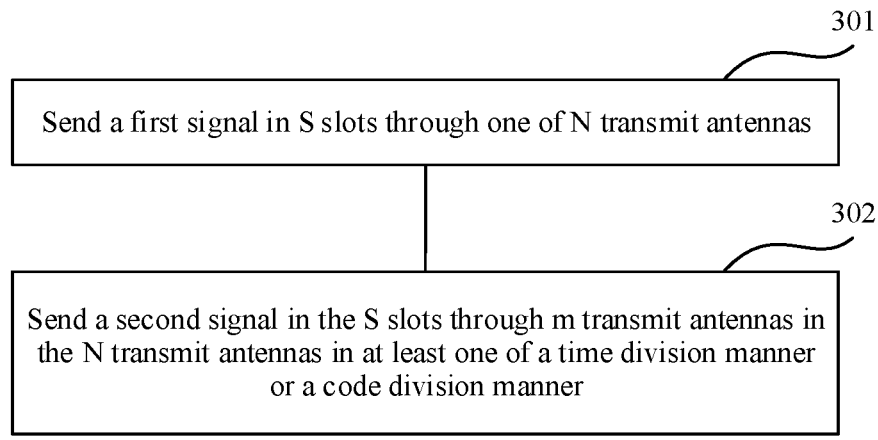
FIG. 3 is a schematic diagram of a radar signal transmitting procedure according to an embodiment of this application.

Refer to FIG. 3. On a transmit side, the method includes the following steps.

Step 301: Send a first signal in S slots through one of N transmit antennas.

In this embodiment of this application, a phase of the first signal remains unchanged in the S slots. For example, if the phase of the first signal in a first slot in the S slots is φ, the phase of the first signal in other slots is φ.

For example, a signal waveform of the first signal in the S slots is an FMCW.

Step 302: Send a second signal in the S slots through m transmit antennas in the N transmit antennas in at least one of a time division manner or a code division manner.

A signal waveform of the second signal in the S slots is also an FMCW, and different phase modulation and coding is used for the first signal and the second signal.

The code division manner is a manner in which coding is formed by modulating a phase of a signal in code division multiple (CDM), Doppler division multiplexing (DDM), or Doppler division multiple access (DDMA), that is, phase modulation and coding.

The second signal is sent through the m transmit antennas, which is equivalent to superposition of signals sent through the m transmit antennas. Phase modulation is performed, by using a step of $2\pi k_y/P$, on a signal that is in the second signal and that is sent through each of the m transmit antennas, where P is an integer greater than 1, $k_y$ is an integer greater than 0 and less than P, $k_y$ represents a phase modulation step used by a $y^{th}$ transmit antenna in the m transmit antennas, and y=1, . . . , or m. In this embodiment of this application, a modulation phase of the second signal may include P phases, the P phases are P even phases in [0, 2π), and a corresponding phase set may be [0, 2π/P, 4π/P, 6π/P, . . . , (P−1)*2π/P]. Because P is at least equal to 2, for example, when P=2, as shown in FIG. 1(b), the P phases are respectively 0 and π. It may be understood that, when P=4, the P phases are respectively 0, π/2, π, and 3π/2, that is, the phase shifter in FIG. 1(b) can provide a total of four high-precision phases 0, π/2, π, and 3π/2 in an entire FMCW frequency sweep slope range. It should be noted that for a complex signal, phase modulation is equivalent to multiplying the signal by exp(jφ), and has a characteristic of equivalence after 2π-period rotation. Therefore, in an actual system, only P phases are used, and other phases of an integer multiple of 2π can be modulated. That is, a phase of 2π/P may be used to replace a phase of 2π/P+u*2π for modulation, where u is an integer.

It should be noted that, because both the second signal and the first signal occupy the S slots for transmission, there is no specific sequence between step 301 and step 302. It only indicates that phase modulation is performed on the first signal and the second signal through different code division, that is, by using steps of different Doppler shifts $2\pi k_y/P$, where P is an integer greater than 1, and $k_y$ is an integer greater than or equal to 0 and less than P. When $k_y$ is equal to 0, it may be understood that a signal occupied by the transmit antenna in a plurality of slots, that is, between adjacent slots, changes to zero.

Because the first signal includes only a signal of one transmit antenna and occupies S consecutive slots, the first signal may be a SIMO signal. An advantage of the first signal is that a speed measurement range is large. The second signal includes signals of the m transmit antennas, and therefore may be understood as a TDM MIMO signal. An advantage of the second signal is that measured angle resolution is high. Because a target moves during measurement, the SIMO signal and the TDM MIMO signal obtain a non-aliased speed of the target by matching a speed index on a same range bin. If the first signal and the second signal are not simultaneously transmitted, due to the SIMO signal and the MIMO signal that are successively transmitted, the target may not find a same range bin, that is, time points of observing the target are different. As a result, a speed of the target cannot be accurately measured. In this application, the first signal and the second signal are simultaneously transmitted. Therefore, this resolves a problem in the conventional technology that when the SIMO signal and the TDM MIMO signal are transmitted in a time division manner, a speed of a high-speed moving target cannot be accurately measured because time points of observing the target are different.

When P=2, that is, binary phase modulation (also referred to as binary phase shift keying (BPSK) in the document, and this is not specifically limited in this embodiment of this application), phase modulation is performed on the first signal and the second signal respectively by using any step of $2\pi k_y/P$, where $k_y$=0 and 1. It may be understood that when $k_y$=0, a phase step in an adjacent slot is 0, that is, a phase in the S slots remains unchanged. It may be understood that phase modulation and coding is [1, 1], where an element in the sequence represents a modulation phase of a signal, 1 indicates that the modulation phase is 0, and −1 indicates that the modulation phase is π. When $k_y$=1, phase modulation is performed on a signal sent through each transmit antenna by using a step of π, that is, phase modulation and coding of all transmit antennas in the second signal is the same, that is, [1, −1]. Therefore, to distinguish between orthogonal waveforms of the m transmit antennas in the second signal, the m transmit antennas in the second signal further send a signal in a time division manner. Because TDM MIMO transmission is not limited by phase control, a quantity of transmit antennas of a radar system may be easily increased by using a plurality of transmit antennas in the second signal, that is, m may be any integer greater than or equal to 2. According to this method, a problem in the conventional technology that a binary phase DDM waveform cannot implement orthogonal transmission of more transmit antennas is resolved. In addition, the first signal is continuously transmitted in the S slots, to ensure a maximum speed measurement range of the radar system, and avoid a problem that a speed measurement range of the radar system decreases due to TDM MIMO transmission.

Actually, when P=2, phase modulation may also be performed on the first signal by using a step of $\pi$. Signals of a plurality of transmit antennas in the second signal are all transmitted by using a step of 0, that is, transmitted in a phase unchanged manner. However, a speed measurement range of the first signal is large. Therefore, if phase modulation is performed on the first signal by using a step of 0, an echo signal of the first signal at a receive end may obtain a large speed measurement range, and there is no additional Doppler shift caused by a non-zero phase modulation step, to further simplify a receiving processing procedure. Therefore, in this embodiment of this application, an example in which phase modulation is performed on the first signal by using a step of 0 is used to describe the following embodiments.

For example, each of the m transmit antennas performs repeated sending by using P*M slots as a period. A plurality of transmit antennas that perform phase modulation by using a step of $2\pi k_y/P$ in the second signal require P slots to complete uniform Doppler modulation, and a plurality of transmit antennas using time division require M slots to complete time division transmission, where M is greater than or equal to 2. Therefore, it is expressed herein that each transmit antenna performs repeated sending by using P*M slots as a period. For example, when P=2, N=3, and m=N−1=2, sending needs to be performed at least once by using four slots as a period.

When each transmit antenna performs repeated sending by using P*M slots as a period, one transmit antenna performs sending based on a transmission pattern in each period. The transmission pattern indicates a relationship between a modulated phase and a modulated amplitude of a signal, and a signal of a transmit antenna using a time division manner occupies P non-conflicting slots at an interval of M slots, where M is a quantity of slots separated between adjacent slots in slots occupied by one of the m transmit antennas, and M is an integer greater than or equal to m/(P−1).

To improve speed resolution, further, (Nd+1)*P*M>S>=Nd*P*M, where Nd represents a quantity of times of transmission periods of the m transmit antennas in a period of P*M slots, and Nd is an integer greater than or equal to 1. A specific value of M may be determined based on an actual situation, and M is an integer greater than or equal to m/(P−1). Herein, it is noted that S may not be equal to an integer multiple of Nd*P*M, and a zero padding operation may be performed at the receive end. This is not limited herein.

Based on the foregoing descriptions, because P is an integer greater than 1, Nd is an integer greater than or equal to 1, and M is an integer greater than 1, S is an integer greater than or equal to 4. A specific value of S may be determined based on an actual situation. This is not limited herein.

In this embodiment of this application, signals sent through each of the m transmit antennas may be distinguished in a time division manner or a code division manner, that is, signals sent through different transmit antennas occupy different slots, or values of $k_y$ are different when phase modulation is performed, by using a step of $2\pi k_y/P$, on signals sent through transmit antennas that occupy a same slot in the m transmit antennas. In this way, even if an amount of P cannot be set to be very large, for example, when P is less than or equal to 4, signals of the N transmit antennas can still be orthogonally transmitted.

For example, values of $k_y$ are different when phase modulation is performed, by using a step of $2\pi k_y/P$, on signals sent through transmit antennas that occupy a same slot in the m transmit antennas. For example, a transmit antenna 1 and a transmit antenna 2 send signals by occupying a same slot. When P=4, a value of $k_y$ corresponding to the transmit antenna 1 is 1, that is, phases of signals sent through the transmit antenna 1 are sequentially cycled by 0, $\pi/2$, $\pi$, and $3\pi/2$; and a value of $k_y$ corresponding to the transmit antenna 2 is 3, that is, phases of signals sent through the transmit antenna 2 are sequentially cycled by 0, $3\pi/2$, $3\pi=2\pi+\pi$, and $9\pi/2=4\pi+\pi/2$. For ease of description, a combination of phases of signals sent through one transmit antenna in one period may be referred to as a transmission pattern of the transmit antenna. In this case, according to the Euler formula $\exp(j\varphi)$, phases of signals of the transmit antenna 1 in four occupied slots are sequentially cycled by 0, $\pi/2$, $\pi$, and $3\pi/2$, and are represented in a form of a complex number. For the transmit antenna 1, phases in P slots at an interval of M in the P*M slots may be represented as [1, j, −1, −j]. Similarly, for the transmit antenna 2, phases in P slots at an interval of M in the P*M slots may be represented as [1, −j, −1, j]. However, it may be understood that the transmission pattern herein can represent only phase modulation, but cannot represent an antenna using time division. Therefore, in this embodiment of this application, x is introduced to indicate silence, and no signal is sent in the slot. Alternatively, x may be represented by 0. It may be understood that an amplitude of a signal in the slot is set to 0, which may be implemented in an actual system by setting a switch to an open state. It can be learned through calculation that, when P=4 and M=2, m is less than or equal to M*(P−1), and a maximum value of m is equal to 6 and N=m+1, so that seven transmit antennas can be obtained through extension. For a specific transmission pattern, refer to a specific embodiment.

In this embodiment of this application, for ease of description, a transmit antenna that sends the first signal is denoted as Tx 0, and transmit antennas that send the second signal are denoted as Tx 1 to Tx m.

Further, in this embodiment of this application, the m transmit antennas that send the second signal and the one transmit antenna that sends the first signal may be different transmit antennas in the N transmit antennas. In this case, Tx 0 that sends the first signal occupies all slots in the S slots. It may be understood that when P=2 and M>m/(P−1)=m, m signals in the second signal do not occupy all slots in the S slots, and only the first signal exists in some slots. For example, when P=2, N=3, and m=N−1=2, M=3. In this case, it is assumed that Tx 1 occupies a slot 1 and a slot 4, Tx 2 occupies a slot 2 and a slot 5, and only the first signal, that is, a signal sent through Tx 0, exists in a slot 3 and a slot 6.

Alternatively, the one transmit antenna that sends the first signal may be one of the m transmit antennas. This is not limited in this embodiment of this application. In this case, when a corresponding conflict occurs, the transmit antenna transmits the second signal through phase coding of the second signal, and a corresponding slot in the first signal may similarly have a small quantity of slots in which signals are vacant. For example, when P=2, N=3, and m=N=3, M=3. In this case, it is assumed that Tx 1 occupies a slot 1 and a slot 4, Tx 2 occupies a slot 2 and a slot 5, and if a rule of the second signal is used for signals sent through Tx 0 in a slot 3 and a slot 6 uses, a step of 1L is used to transmit Tx 0. In this case, the first signal transmitted by using the rule of the second signal has one vacancy in every three of the S slots.

Certainly, when M is small, it can be learned that in the S slots, a ratio of vacant antennas transmitted based on the feature of the first signal is close to 1/M. As a result, the SIMO signal is equivalent to being down-sampled. Therefore, this transmission manner is suitable when M is large, for example, when M is greater than 3.

For example, values of $k_y$ are different when phase modulation is performed, by using a step of $2\pi k_y/P$, on signals sent through transmit antennas that occupy a same slot in the m transmit antennas. For example, $k_y=1, 2, \ldots$, and P−1. For example, when P=3, values of $k_y$ of m antennas in the second signal are 1 and 2. A value of $k_y$ corresponding to the transmit antenna 1 is 1, that is, phases of signals sent through the transmit antenna 1 are sequentially cycled by 0, $2\pi/3$, and $4\pi/3$. A value of $k_y$ corresponding to the transmit antenna 2 is 2, that is, phases of signals sent through the transmit antenna 2 are sequentially cycled by 0, $4\pi/3$, and $8\pi/3=2\pi+2\pi/3$. For ease of description, a combination of phases of signals sent through one transmit antenna in one period may be referred to as a transmission pattern of the transmit antenna. In this case, according to the Euler formula exp(j), phases of signals of the transmit antenna 1 in three occupied slots are sequentially cycled by 0, $2\pi/3$, and $4\pi/3$, and are represented in a form of a complex number. For the transmit antenna 1, phases in P slots at an interval of M in the P*M slots may be represented as [1, exp(j$2\pi/3$), exp(j$4\pi/3$)]. Similarly, for the transmit antenna 2, phases in P slots at an interval of M in the P*M slots may be represented as [1, exp(j$4\pi/3$), exp(j$2\pi/3$)]. However, it may be understood that the transmission pattern herein can represent only phase modulation, but cannot represent an antenna using time division. Therefore, in this embodiment of this application, x is introduced to indicate silence, and no signal is sent in the slot. Alternatively, x may be represented by 0. It may be understood that an amplitude of a signal in the slot is set to 0, which may be implemented in an actual system by setting a switch to an open state. It can be learned through calculation that, when P=3 and M=2, m is less than or equal to M*(P−1), and a maximum value of m is equal to 4 and N=m+1=5, so that five transmit antennas can be obtained through extension. If a value of M is set to be larger, it can be easily extended to more values of N. A specific transmission pattern is not described again.

The following describes different first signals and second signals by using specific embodiments of values of N, m, M, and P.

Embodiment 1

Figure 4:
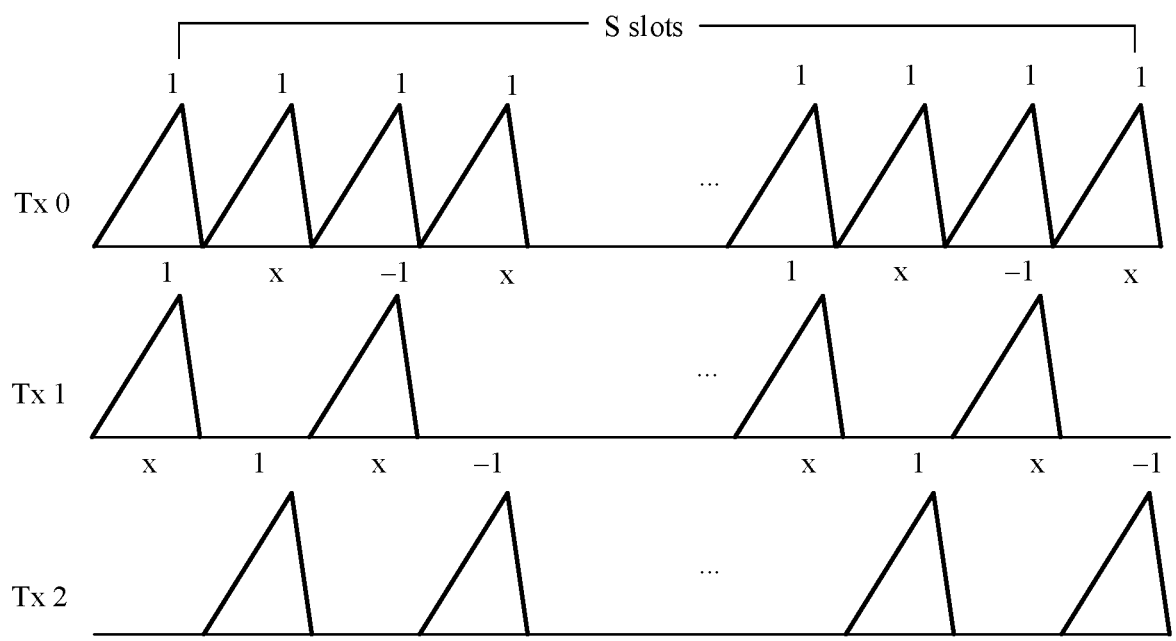
FIG. 4 is a schematic diagram of a radar signal according to an embodiment of this application.

FIG. 4 is a schematic diagram of a signal according to an embodiment of this application. In FIG. 4, descriptions are provided by using an example in which N=3, that is, three transmit antennas are used to transmit radar signals, P=2, that is, a phase shifter can provide at least stable 0 and 1L phase modulation, m=2, and a second signal includes two transmit antennas. Based on the foregoing descriptions, M is an integer greater than or equal to m/(P−1). In this case, it can be learned through calculation that M is greater than or equal to 2. Descriptions are provided by using an example in which a minimum value of M is set, that is, M=2. In FIG. 4, a first signal is sent through a transmit antenna Tx 0. In S slots, the first signal includes S chirp signals, and a phase of each chirp signal remains unchanged.

The second signal includes a plurality of chirp signals, the second signal is sent through a transmit antenna Tx 1 and a transmit antenna Tx 2 in a time division manner, and a period of the signal sent through Tx 1 and Tx 2 is four slots. A transmission pattern of Tx 1 in each period may indicate that a relationship between a modulated phase and a modulated amplitude of a signal is [1, x, −1, x], and a transmission pattern of Tx 2 in each period may indicate that a relationship between a modulated phase and a modulated amplitude of a signal is [x, 1, x, −1]. Herein, x indicates silence, and no signal is sent in the slot. Alternatively, x may be represented by 0, that is, the transmission pattern of Tx 1 in each period may be written as [1, 0, −1, 0], and the transmission pattern of Tx 2 in each period may be written as [0, 1, 0, −1]. It may be understood that an amplitude of a signal in the slot is set to 0, which may be implemented in an actual system by setting a switch to an open state. 1 indicates that a phase of a chirp signal in the slot is modulated by 0 radians, and −1 indicates that a phase of a chirp signal in the slot is modulated by 1L radians. This may be implemented in the actual system by setting a switch to a closed state and selecting a corresponding phase of a phase shifter. It can be learned from FIG. 4 that a slot occupied by a signal sent through Tx 1 is different from a slot occupied by a signal sent through Tx 2. In the slot occupied by the signal sent through Tx 1, adjacent slots are separated by two slots. In the slot occupied by the signal sent through Tx 2, adjacent slots are separated by two slots.

It should be noted that the chirp signal provided in FIG. 4 is a rising linear continuous frequency modulation wave, or the chirp signal may be a falling linear continuous frequency modulation wave. This is not limited in this embodiment of this application.

Different phase modulation and coding is used for the first signal and the second signal, and only phases 0 and 1L are used. Therefore, only a stable binary phase modulator is required to transmit the first signal and the second signal, to reduce a requirement on a chip. To improve speed resolution, further, a time length occupied by the S slots may be increased, and S≥Nd*P*M, where Nd represents a quantity of repetition times of transmission patterns of m transmit antennas, and Nd is greater than or equal to 1. The transmission pattern indicates that a signal of a transmit antenna using a time division manner occupies P non-conflicting slots at an interval of M slots, where M is a quantity of slots separated between adjacent slots in slots occupied by one of the m transmit antennas, and M is an integer greater than or equal to m/(P−1). A specific value of M may be determined based on an actual situation, and M is an integer greater than or equal to m/(P−1).

In this embodiment, M=m/(P−1). It may be understood that a maximum speed measurement range corresponding to the second signal is set to a maximum value. M may also be set to an integer greater than m/(P−1), for example, N=3, P=2, and M=3. Although such a method reduces a maximum speed measurement range of the second signal, in some slots, a quantity of phase steps used by each of the first signal and the second signal may be less than P. In this case, a receive end may determine a Doppler frequency of the first signal by using a vacant phase step, to further simplify a signal receiving processing procedure. Specifically, the first signal is sent in each slot, and a transmission pattern of a transmit antenna Tx 0 that transmits the first signal may be written as six slots and represented as [1, 1, 1, 1, 1, 1]. Transmission patterns of a plurality of transmit antennas that transmit the second signal are respectively as follows: A transmission pattern of Tx 1 may be written as six slots and represented as [1, x, x, −1, x, x], and a transmission pattern of Tx 2 is represented as [x, 1, x, x, −1, x] in six slots. In this case, only a signal of a transmit antenna in the first signal exists in a third slot and a sixth slot, a signal of a second transmit antenna is gated and controlled by a switch in a third slot and a sixth slot, and no antenna is gated. In this case, echo signals in the third slot and the sixth slot are extracted, and an observed Doppler frequency is an echo signal of a transmit antenna signal in the first signal. Doppler frequencies in a first slot, a fourth slot, a second slot, and a fifth slot include an echo signal of a transmit antenna signal in the first signal and the second signal. A Doppler frequency corresponding to a transmit antenna in the first signal can be easily found by comparing sub-RD diagrams in different slots.

In this embodiment, a value of Nd may be further constrained based on a requirement for resolution precision. Herein, for example, when Nd=32, it can be learned according to S≥Nd*P*M that a minimum value of S is 32*2*2=128, that is, a transmission pattern of each transmit antenna in four slots is repeatedly transmitted for 32 times. It may be understood that Nd may alternatively be set to any other integer value. Details are not described herein.

Actually, based on the foregoing descriptions, when P=2, N=12, and M=11, a transmission pattern may be shown in Table 1.

paring a Doppler frequency in a received echo signal in the S0 slots and a Doppler frequency in a received echo signal in the S slots, and a Doppler index location corresponding to Tx 0 in the S slots is determined, to further simplify a procedure of obtaining a speed of the target on the receive side.

Figure 5:
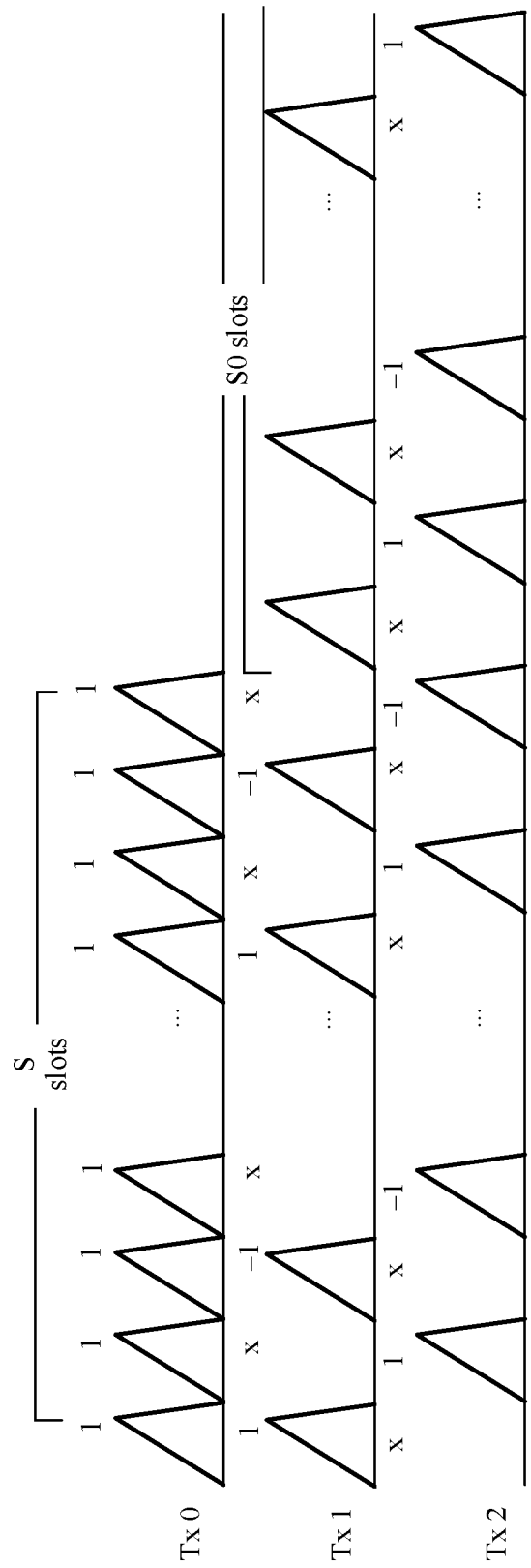
FIG. 5 is a schematic diagram of another radar signal according to an embodiment of this application.

For example, with reference to FIG. 4, FIG. 5 is a schematic diagram of a signal according to an embodiment of this application. In FIG. 5, descriptions are provided by using an example in which m=2, P=2, and M=2. In FIG. 5, for the first signal and the second signal that are sent in the foregoing S slots, refer to FIG. 4. The third signal is sent in the S0 slots after the S slots through Tx 1 and Tx 2. A transmission pattern of the third signal is the same as a transmission pattern of the second signal, that is, a period of the signal sent through Tx 1 and Tx 2 is four slots. A transmission pattern of Tx 1 in each period may indicate that a relationship between a modulated phase and a modulated amplitude of a signal is [1, x, −1, x], and a transmission pattern of Tx 2 in each period may indicate that a relationship between a modulated phase and a modulated amplitude of a signal is [x, 1, x, −1]. It can be learned from FIG. 5 that

TABLE 1

|       | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|-------|---|---|---|---|---|---|---|---|---|----|----|----|----|----|----|----|----|----|----|----|----|----|
| Tx 0  | 1 | 1 | 1 | 1 | 1 | 1 | 1 | 1 | 1 | 1  | 1  | 1  | 1  | 1  | 1  | 1  | 1  | 1  | 1  | 1  | 1  | 1  |
| Tx 1  | 1 |   |   |   |   |   |   |   |   |    |    | −1 |    |    |    |    |    |    |    |    |    |    |
| Tx 2  |   | 1 |   |   |   |   |   |   |   |    |    |    | −1 |    |    |    |    |    |    |    |    |    |
| Tx 3  |   |   | 1 |   |   |   |   |   |   |    |    |    |    | −1 |    |    |    |    |    |    |    |    |
| Tx 4  |   |   |   | 1 |   |   |   |   |   |    |    |    |    |    | −1 |    |    |    |    |    |    |    |
| Tx 5  |   |   |   |   | 1 |   |   |   |   |    |    |    |    |    |    | −1 |    |    |    |    |    |    |
| Tx 6  |   |   |   |   |   | 1 |   |   |   |    |    |    |    |    |    |    | −1 |    |    |    |    |    |
| Tx 7  |   |   |   |   |   |   | 1 |   |   |    |    |    |    |    |    |    |    | −1 |    |    |    |    |
| Tx 8  |   |   |   |   |   |   |   | 1 |   |    |    |    |    |    |    |    |    |    | −1 |    |    |    |
| Tx 9  |   |   |   |   |   |   |   |   | 1 |    |    |    |    |    |    |    |    |    |    | −1 |    |    |
| Tx 10 |   |   |   |   |   |   |   |   |   | 1  |    |    |    |    |    |    |    |    |    |    | −1 |    |
| Tx 11 |   |   |   |   |   |   |   |   |   |    | 1  |    |    |    |    |    |    |    |    |    |    | −1 |

In Table 1, each grid in the first row represents one slot, and each grid in the first column represents one transmit antenna. Numbers of transmit antennas in Table 1 are merely logical numbers, and transmit antennas with adjacent numbers do not represent an actual spatial adjacency relationship. A transmit antenna of the first signal is denoted as Tx 0, and a signal is modulated by using a phase 0. Transmit antennas of the second signal are denoted as Tx 1 to Tx 11. Because P=2, $k_y$=1, and m=N−1=11, signals transmitted through the 11 transmit antennas in the second signal are modulated by using a step of $2\pi k_y/P=2\pi$. The transmit antennas Tx 1 to Tx 11 that send the second signal are transmit antennas using time division, and occupy P=2 non-conflicting slots at an interval of M=m/(P−1)=11 slots.

Embodiment 2

In Embodiment 2, in addition to sending both the first signal and the second signal in the S slots, a third signal may be further sent in S0 slots after the S slots through the m transmit antennas in a time division manner, where S0 is an integer greater than 1.

A transmission pattern of the third signal in the S0 slots is the same as a transmission pattern of the second signal in the S slots, where S=Nd*P*M, and M is an integer greater than or equal to m/(P−1).

The first signal does not exist in the S0 slots. Because the first signal sent through Tx 0 exists only in the S slots, a Doppler frequency of a target may be determined by coma signal sent through Tx 1 in the S0 slots is the same as a signal sent in the S slots, and a signal sent through Tx 2 in the S0 slots is the same as a signal sent in the S slots. Herein, x indicates silence, and no signal is sent in the slot. Alternatively, x may be represented by 0. It may be understood that an amplitude of a signal in the slot is set to 0, which may be implemented in an actual system by setting a switch to an open state. 1 indicates that a phase of a chirp signal in the slot is modulated by 0 radians, and −1 indicates that a phase of a chirp signal in the slot is modulated by 1L radians. This may be implemented in the actual system by setting a switch to a closed state and selecting a corresponding phase of a phase shifter. It can be learned from FIG. 5 that a slot occupied by a signal sent through Tx 1 is different from a slot occupied by a signal sent through Tx 2. In the slot occupied by the signal sent through Tx 1, adjacent slots are separated by two slots. In the slot occupied by the signal sent through Tx 2, adjacent slots are separated by two slots.

In addition, when 5=128 and S0=128, it may be understood that two transmit antennas in the second signal repeatedly transmit a signal for 32*2=64 times by using a predetermined transmission pattern in four slots. One transmit antenna in the first signal repeatedly transmits a signal for 32 times by using a predetermined transmission pattern in four slots. Because speed resolution for measuring a speed of a target is inversely proportional to values of S and S0, it may be understood that S and S0 may be set to other integer values greater than 0. A larger value indicates higher speed resolution.

Embodiment 3

Figure 6:
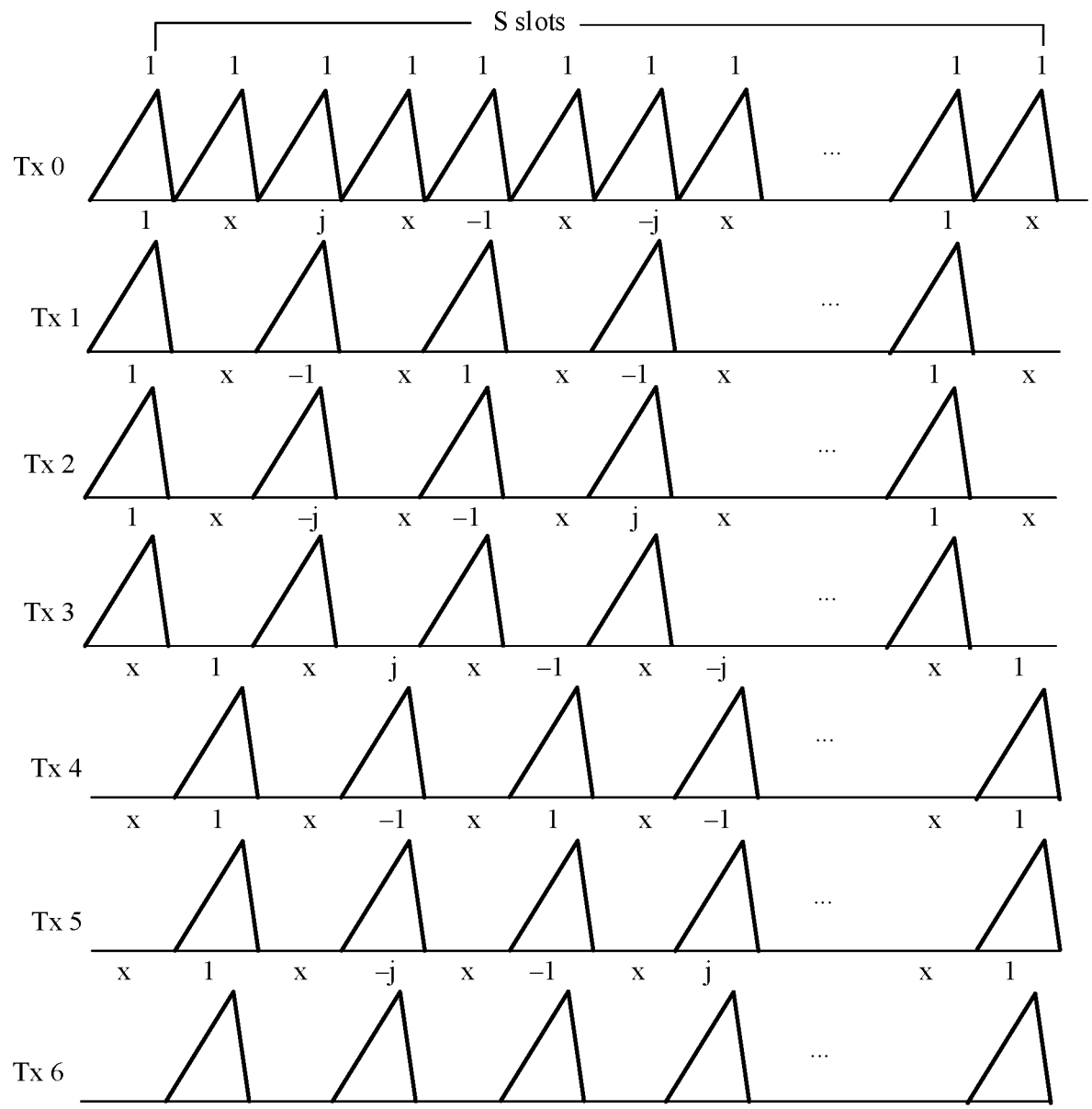
FIG. 6 is a schematic diagram of another radar signal according to an embodiment of this application.

In the foregoing embodiments, descriptions are provided by using an example in which P=2. Alternatively, a quantity P of phases included in the second signal may be another value. For example, when P=4, FIG. 6 is a schematic diagram of a signal according to an embodiment of this application. In FIG. 6, descriptions are provided by using an example in which m=6, P=4, and M=2. In FIG. 6, a first signal is sent through a transmit antenna Tx 0. The first signal includes S chirp signals, and a phase of each chirp signal remains unchanged.

The second signal is sent through the transmit antenna Tx 1 to the transmit antenna Tx 6, and a period of a signal sent through each transmit antenna is eight slots. The six transmit antennas may be group into two groups. One group includes Tx 1, Tx 2, and Tx 3, and the other group includes Tx 4, Tx 5, and Tx 6.

Tx 1, Tx 2, and Tx 3 may occupy a same slot, but send signals through different phase modulation and coding. Specifically, a transmission pattern of Tx 1 in each period may indicate that a relationship between a modulated phase and a modulated amplitude of a signal is [1, x, j, x, −1, x, −j, x], that is, a step is π/2. A transmission pattern of Tx 2 in each period may indicate that a relationship between a modulated phase and a modulated amplitude of a signal is [1, x, −1, x, 1, x, −1, x], that is, a modulation step is π. A transmission pattern of Tx 3 in each period may indicate that a relationship between a modulated phase and a modulated amplitude of a signal is [1, x, −j, x, −1, x, j, x], that is, a modulation step is 3π/2. Herein, x indicates silence, and no signal is sent in the slot. 1 indicates that a phase of a chirp signal in the slot is modulated by 0 radians, j indicates that a phase of a chirp signal in the slot is modulated by π/2 radians, −1 indicates that a phase of a chirp signal in the slot is modulated by π radians, and −j indicates that a phase of a chirp signal in the slot is modulated by 3π/2 radians.

Tx 4, Tx 5, and Tx 6 in a first group and Tx 1, Tx 2, and Tx 3 in a second group occupy different slots to send signals, that is, time division orthogonality. Similarly, a transmission pattern of Tx 4 in each period may indicate that a relationship between a modulated phase and a modulated amplitude of a signal is [x, 1, x, j, x, −1, x, −j], that is, a modulation step is π/2. A transmission pattern of Tx 5 in each period may indicate that a relationship between a modulated phase and a modulated amplitude of a signal is [x, 1, x, −1, x, 1, x, −1], that is, a modulation step is π. A transmission pattern of Tx 6 in each period may indicate that a relationship between a modulated phase and a modulated amplitude of a signal is [x, 1, x, −j, x, −1, x, j], that is, a modulation step is 3π/2.

It should be noted that the transmission pattern of the signal sent through Tx 4 may be a cyclic shift sequence of the transmission pattern of the signal sent through Tx 1. The cyclic shift sequence may be a new sequence obtained by performing clockwise or counterclockwise shift on a base sequence. For example, a base sequence is [1, x, j, x, −1, x, −j, x]. In this case, a sequence [x, 1, x, j, x, −1, x, −j] may be obtained by performing counterclockwise cyclic shift once on the base sequence, a sequence [j, x, −1, x, −j, x, 1, x] may be obtained by performing clockwise cyclic shift twice on the base sequence, and the like. Correspondingly, the transmission pattern of the signal sent through Tx 5 may be a cyclic shift sequence of the signal sent through Tx 2, and the transmission pattern of the signal sent through Tx 6 may be a cyclic shift sequence of the transmission pattern of the signal sent through Tx 3. Specific phase steps selected for all transmit antennas in a group of antennas occupying a same slot need to be different. A specific phase step corresponding to a transmit antenna sequence provided in this embodiment is not limited in this application.

Further, when P=4 and N=16, a transmission pattern may be represented by Table 2.

TABLE 2

|  | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Tx 0 | 1 | 1 | 1 | 1 | 1 | 1 | 1 | 1 | 1 | 1 | 1 | 1 | 1 | 1 | 1 | 1 | 1 | 1 | 1 | 1 |
| Tx 1 | 1 |   |   |   |   | j |   |   |   |   | −1 |   |   |   |   | −j |   |   |   |   |
| Tx 2 | 1 |   |   |   |   | −1 |   |   |   |   | 1 |   |   |   |   | −1 |   |   |   |   |
| Tx 3 | 1 |   |   |   |   | −j |   |   |   |   | −1 |   |   |   |   | j |   |   |   |   |
| Tx 4 |   | 1 |   |   |   |   | j |   |   |   |   | −1 |   |   |   |   | −j |   |   |   |
| Tx 5 |   | 1 |   |   |   |   | −1 |   |   |   |   | 1 |   |   |   |   | −1 |   |   |   |
| Tx 6 |   | 1 |   |   |   |   | −j |   |   |   |   | −1 |   |   |   |   | j |   |   |   |
| Tx 7 |   |   | 1 |   |   |   |   | j |   |   |   |   | −1 |   |   |   |   | −j |   |   |
| Tx 8 |   |   | 1 |   |   |   |   | −1 |   |   |   |   | 1 |   |   |   |   | −1 |   |   |
| Tx 9 |   |   | 1 |   |   |   |   | −j |   |   |   |   | −1 |   |   |   |   | j |   |   |
| Tx 10 |   |   |   | 1 |   |   |   |   | j |   |   |   |   | −1 |   |   |   |   | −j |   |
| Tx 11 |   |   |   | 1 |   |   |   |   | −1 |   |   |   |   | 1 |   |   |   |   | −1 |   |
| Tx 12 |   |   |   | 1 |   |   |   |   | −j |   |   |   |   | −1 |   |   |   |   | j |   |
| Tx 13 |   |   |   |   | 1 |   |   |   |   | j |   |   |   |   | −1 |   |   |   |   | −j |
| Tx 14 |   |   |   |   | 1 |   |   |   |   | −1 |   |   |   |   | 1 |   |   |   |   | −1 |
| Tx 15 |   |   |   |   | 1 |   |   |   |   | −j |   |   |   |   | −1 |   |   |   |   | j |

In Table 2, each grid in the first row represents one slot, and each grid in the first column represents one transmit antenna. Numbers of transmit antennas in Table 2 are merely logical numbers, and transmit antennas with adjacent numbers do not represent an actual spatial adjacency relationship. A transmit antenna of the first signal is denoted as Tx 0, and a signal is modulated by using a phase 0. Transmit antennas of the second signal are denoted as Tx 1 to Tx 15. If P=4, transmission of N=16 transmit antennas is implemented, and M is at least (N−1)/(P−1)=5, a transmission pattern indicates P*M slots, that is, 4*5=20 slots. A transmit antenna of the first signal is denoted as Tx 0, a signal is modulated by using a phase 0, and [1, 1, 1, 1, 1, 1, 1, 1, 1, 1, 1, 1, 1, 1, 1, 1, 1, 1, 1, 1] indicates modulation signals in the 20 slots. The second signal is separately sent through Tx 1 to Tx 15 in a time division manner or a code division manner, that is, antennas using code division are modulated by using steps of π/2, π, and 3π/2, and antennas using time division separately occupy P=4 non-conflicting slots at an interval of M=(N−1)/(P−1)=5 slots. Different phase modulation and coding may be used for Tx 1, Tx 2, and Tx 3 for sending, and sent modulation signals in the 20 slots are respectively represented as [1, x, x, x, x, j, x, x, x, x, −1, x, x, x, x, j, x, x, x, x], [1, x, x, x, x, −1, x, x, x, x, 1, x, x, x, x, −1, x, x, x, x], and [1, x, x, x, x, −j, x, x, x, x, −1 X, x, x, x, J, X, x, x, x]. Tx 4, Tx 5, and Tx 6 may use different slots from Tx 1 to Tx 3. For example, phase coding is that Tx 1 to Tx 3 cyclically shift one slot counterclockwise, and sent modulation signals in the 20 slots are respectively represented as [x, 1, x, x, x, x, j, x, x, x, x, −1, x, x, x, x, −j, x, x, x], [x, 1, x, x, x, x, −1, x, x, x, x, 1, x, x, x, x, −1, x, x, x], and [x, 1, x, x, x, x, −j, x, x, x, x, −1, x, x, x, x, j, x, x, x]. Similarly, phase coding of Tx 7 to Tx 9 is that Tx 1 to Tx 3 cyclically shift two slots counterclockwise, phase coding of Tx 10 to Tx 12 is that Tx 1 to Tx 3 cyclically shift three slots counterclockwise, and phase coding of Tx 13 to Tx 15 is that Tx 1 to Tx 3 cyclically shift four slots counterclockwise.

It should be noted that when P is equal to another value, for specific structures of the first signal and the second signal, reference may be made to the foregoing descriptions. Details are not described herein again.

Embodiment 4

In the foregoing descriptions, the m transmit antennas that send the second signal send signals in the S slots by using a same configuration. The m transmit antennas may alternatively be in the S slots. The m transmit antennas in the second signal are grouped into different groups, different $M_i$ or $m_i$ is selected for each group, and i is set to at least two configurations of 1 and 2.

For example, in first S1 slots in the S slots, the second signal may be separately sent through N1 transmit antennas in the m transmit antennas by using P*M1 slots as a period and by selecting P non-conflicting slots at an interval of M1 from P*M1 slots in one period; and in last S2 slots in the S slots, the second signal is separately sent through N2 transmit antennas other than the N1 transmit antennas in the m transmit antennas by using P*M2 slots as a period and by selecting P non-conflicting slots at an interval of M2 from P*M2 slots in one period, where m=N1+N2, N1>=2, N2>=1, S=S1+S2, M1≠M2, M1>=N1/(P−1), and M2>=N2/(P−1).

For example, descriptions are provided by using an example in which N=5, m=N−1=4, P=2, N1=2, N2=2, M1=2, and M2=3. The first signal is sent through a transmit antenna Tx 0. The first signal includes S chirp signals, and a phase of each chirp signal remains unchanged.

The second signal is sent through a transmit antenna Tx 1 and a transmit antenna Tx 2. A transmission pattern of Tx 1 in each period may indicate that a relationship between a modulated phase and a modulated amplitude of a signal is [1, x, −1, x], and a transmission pattern of Tx 2 in each period may indicate that a relationship between a modulated phase and a modulated amplitude of a signal is [x, 1, x, −1]. A transmission pattern of Tx 4 in each period may indicate that a relationship between a modulated phase and a modulated amplitude of a signal is [1, x, x, −1, x, x]. A transmission pattern of Tx 4 in each period may indicate that a relationship between a modulated phase and a modulated amplitude of a signal is [x, 1, x, x, −1, x]. A period of the signal sent through Tx 1 and Tx 2 is four slots, and the signal is repeatedly transmitted for Nd1 times. A period of the signal sent through Tx 3 and Tx 4 is six slots, and the signal is repeatedly transmitted for Nd2 times. Nd1 and Nd2 each are greater than or equal to 2. That is, it may be understood that S=Nd1*4 and S2=Nd2*6.

Similar to other embodiments, Nd1 and Nd2 may be set to larger integers, to further improve speed resolution. For example, Nd1=Nd2=32. Such a multi-configuration can avoid two targets whose speeds differ by half of a maximum speed measurement range, where a Doppler index of an echo signal of a signal of Tx 0 of a target 1 is exactly the same as a Doppler index of an echo signal of signals of Tx 1 and Tx 2 that are of a target 2 and that are modulated to a phase t. Because M1 and M2 in a configuration 1 and a configuration 2 are different, a maximum speed measurement range in the configuration 1 and a maximum speed measurement range in the configuration 2 are different. Even if in the configuration 1, the target 1 and the target 2 are hardly be distinguished as two targets in an echo of a signal of Tx 0, the target 1 and the target 2 can be easily identified as two targets in the configuration 2. Therefore, aliasing of a plurality of targets due to a Doppler frequency difference Vmax*k/P included in the echo signal of the signal of Tx 0 is avoided. Because Vmax=λ/(4*T) in different configurations, for different M configurations, transmission repetition periods $T=M*T_{SIMO}$ are different. Herein, a transmission repetition period T1 of the configuration 1 is equal to $2*T_{SIMO}$, and a transmission repetition period T1 of the configuration 2 is equal to $3*T_{SIMO}$. In the configuration 1, two targets whose Doppler spectral lines conflict may be separated in the configuration 2.

The foregoing descriptions are merely an example. In the S slots, another different configuration may be used, or a case in which P=4 exists. Examples are not described one by one herein.

Corresponding to the signal sending method shown in FIG. 3, an embodiment of this application further provides a method, to process an echo signal formed after a first signal and a second signal are reflected by one or more targets, so as to obtain one or more speeds of the one or more targets, and further obtain angle information (for example, a horizontal azimuth and a vertical azimuth) of the one or more targets.

Figure 7:
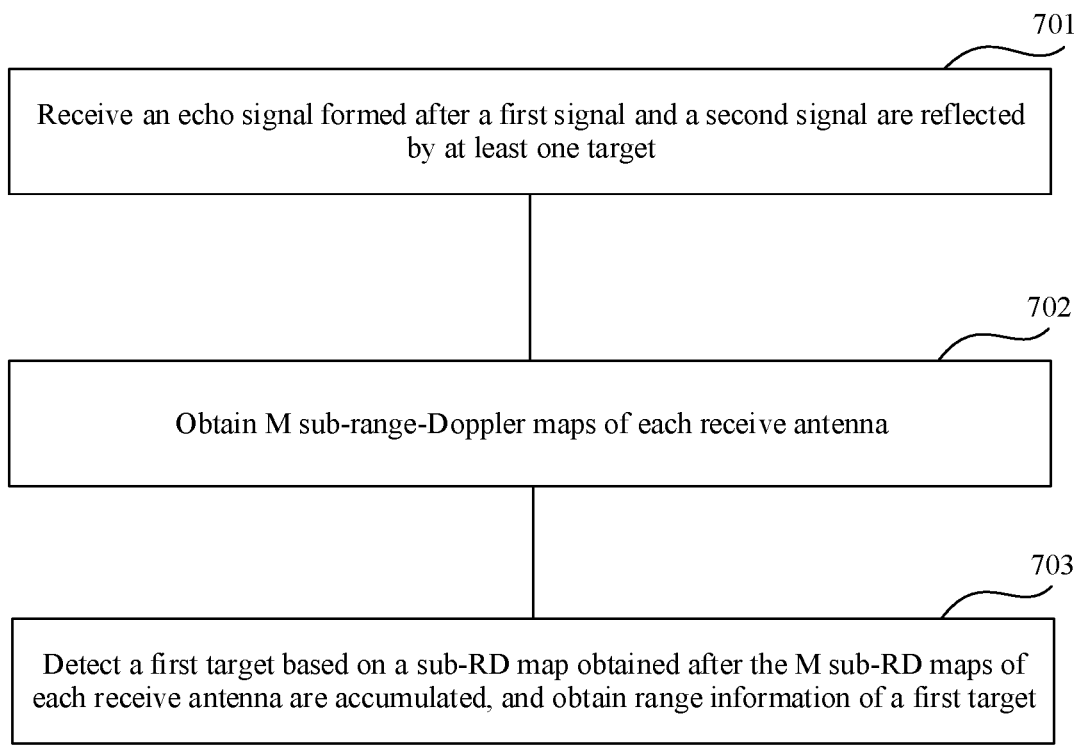
FIG. 7 is a schematic diagram of a radar signal receiving procedure according to an embodiment of this application.

The method may be applied to a radar apparatus, especially a MIMO radar. The radar apparatus includes N transmit antennas and at least one receive antenna. Refer to FIG. 7. The method includes the following steps.

Step 701: Receive an echo signal formed after a first signal and a second signal are reflected by at least one target.

For specific content of the first signal and the second signal, refer to the procedure shown in FIG. 3.

To be specific, the echo signal formed after the first signal and the second signal are reflected by at least one target is received. The first signal is sent in S slots through one of N transmit antennas, and a phase of the first signal remains unchanged in the S slots; the second signal is sent in the S slots through m transmit antennas in the N transmit antennas in at least one of a time division manner and a code division manner; phase modulation is performed, by using a step of $2\pi k_y/P$, on a signal that is in the second signal and that is sent through each of the m transmit antennas, where P is an integer greater than 1, $k_y$ is an integer greater than 0 and less than P, $k_y$ represents a phase modulation step used by a $y^{th}$ transmit antenna in the m transmit antennas, and y=1, . . . , or m; and S is an integer greater than or equal to 4.

Step 702: Obtain M sub-range-Doppler maps (RD Map) of each receive antenna.

Each receive antenna herein is each of all receive antennas included in the radar apparatus. An $i^{th}$ sub-RD map in the M sub-RD maps of each receive antenna is a result of performing 2D-FFT on signals at an interval of M slots that are in echo signals of the receive antenna in the S slots and whose start slots are respectively i, where i is set to any integer of 1, 2, . . . , and M.

Step 703: Detect a first target based on the sub-RD map obtained after the M sub-RD maps of each receive antenna are accumulated, and obtain range information of the first target.

The first target is one or more of the at least one target.

Figure 8:
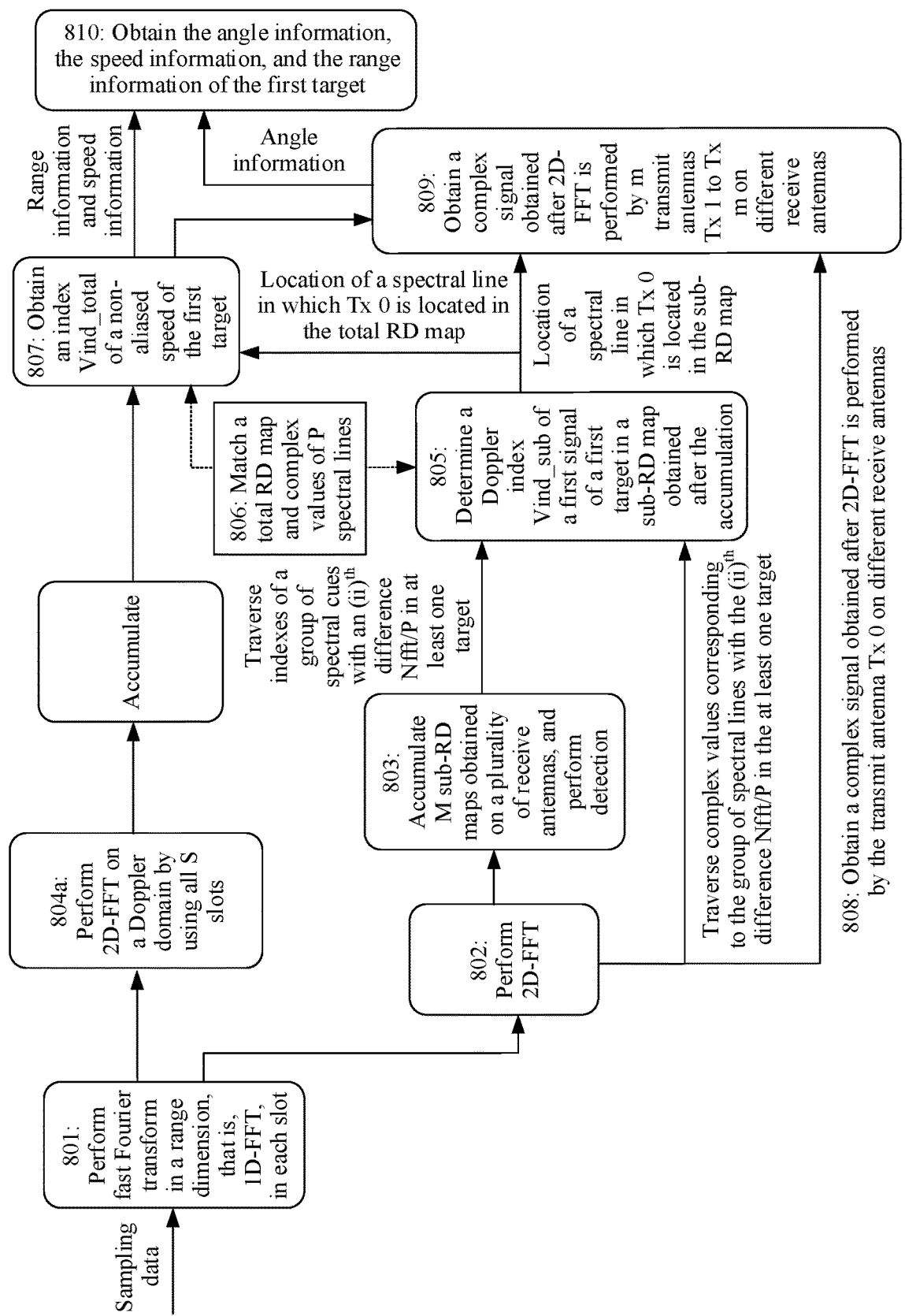
FIG. 8 is a schematic diagram of another radar signal receiving procedure according to an embodiment of this application.

The range information of the first target may be obtained in the procedure shown in FIG. 7. In this embodiment of this application, angle information and speed information of the first target may be further obtained. Details may be shown in FIG. 8.

Step 801: Perform one-dimensional fast Fourier transform (FFT) (TD-FFT), that is, fast Fourier transform in a range dimension, in each slot based on a difference frequency signal of a received echo signal.

It is assumed that Nrx receive antennas obtain a plurality of sampled signals in each slot, and a dimension of FFT in a range dimension is Nrange. An FFT operation is performed on a plurality of sampled signals of one receive antenna in each slot, to obtain a complex matrix dimension Nrange*S*Nrx.

Step 802: Based on a result of 1D-FFT, calculate, one by one, signals at an interval of M slots that are extracted from each range bin and whose start slots are respectively 1 to M to perform two-dimensional FFT (2D-FFT), that is, Doppler Fourier transform, and separately obtain complex values of M sub-RD maps on Nrx receive antennas, to obtain M sub-RD maps of each receive antenna.

An RD map is a radar output graph in which one dimension is range information and the other dimension is Doppler information. The RD map is referred to as a range bin in terms of a range dimension, is referred to as a Doppler bin in terms of a Doppler dimension, and is referred to as a range-Doppler cell in terms of both a range dimension and a Doppler dimension.

It should be noted that, in a process of obtaining the sub-RD map, the following operations may be further performed on the echo signal, for example, signal windowing, transmit/receive channel calibration (Tx/Rx Calibration), and zero-padding. This is not limited in this embodiment of this application. For details, refer to descriptions in the conventional technology. The details are not described herein.

Further, after the M sub-RD maps of each receive antenna are obtained, in step 703, the first target may be detected based on the M sub-RD maps of each receive antenna, and the range information of the first target may be obtained, which may specifically include the following step:

Step 803: Accumulate M sub-RD maps obtained on a plurality of receive antennas to obtain a sub-RD map obtained after the accumulation, and perform detection on the sub-RD map obtained after the accumulation to obtain a range index Rind of the first target, that is, the range information of the first target.

Specifically, the range index Rind and a Doppler index Vind of the first target are obtained, where Vind is a Doppler index of a detected target in a range of [1, Nfft/P]. Target detection is performed based on a coherent accumulation value or an incoherent accumulation value of the M sub-RD maps of the Nrx receive antennas. The coherent accumulation value is a value of in-phase superposition for signal accumulation manners of different transmit antennas or receive antennas, that is, a maximum value in a beam direction of a predetermined angle is selected. The incoherent accumulation value is a value of amplitude superposition for signal accumulation manners of different transmit antennas or receive antennas.

Threshold detection may be performed in a range dimension. In addition to a constant false alarm rate (CFAR) herein, another detection method may be further used to obtain the range index Rind of the first target, for example, a noise threshold-based method.

Step 804a: Perform 2D-FFT on a Doppler domain by using all S slots, to obtain a complex value of a total range-Doppler map (RD Map).

Specifically, two-dimensional FFT (2D-FFT), that is, fast Fourier transform in a Doppler dimension, is performed on the result of 1D-FFT in the S slots, to obtain a complex value of a total range-Doppler map (RD Map) of signals on a plurality of receive channels.

The signals on the plurality of receive channels are accumulated to obtain energy of each range-Doppler cell in a total RD map. It may be understood that a dimension of the total RD map is Nrange*(M*Nfft), that is, a range dimension is the same as a dimension of the sub-RD map, and a Doppler dimension is M times of the sub-RD map.

In the total RD map, 2D-FFT of M*Nfft points is performed on the Doppler domain by using all the S slots based on step 801, and extraction at an interval of M is no longer performed. Incoherent superposition is performed only on the Nrx receive antennas.

Figure 9:
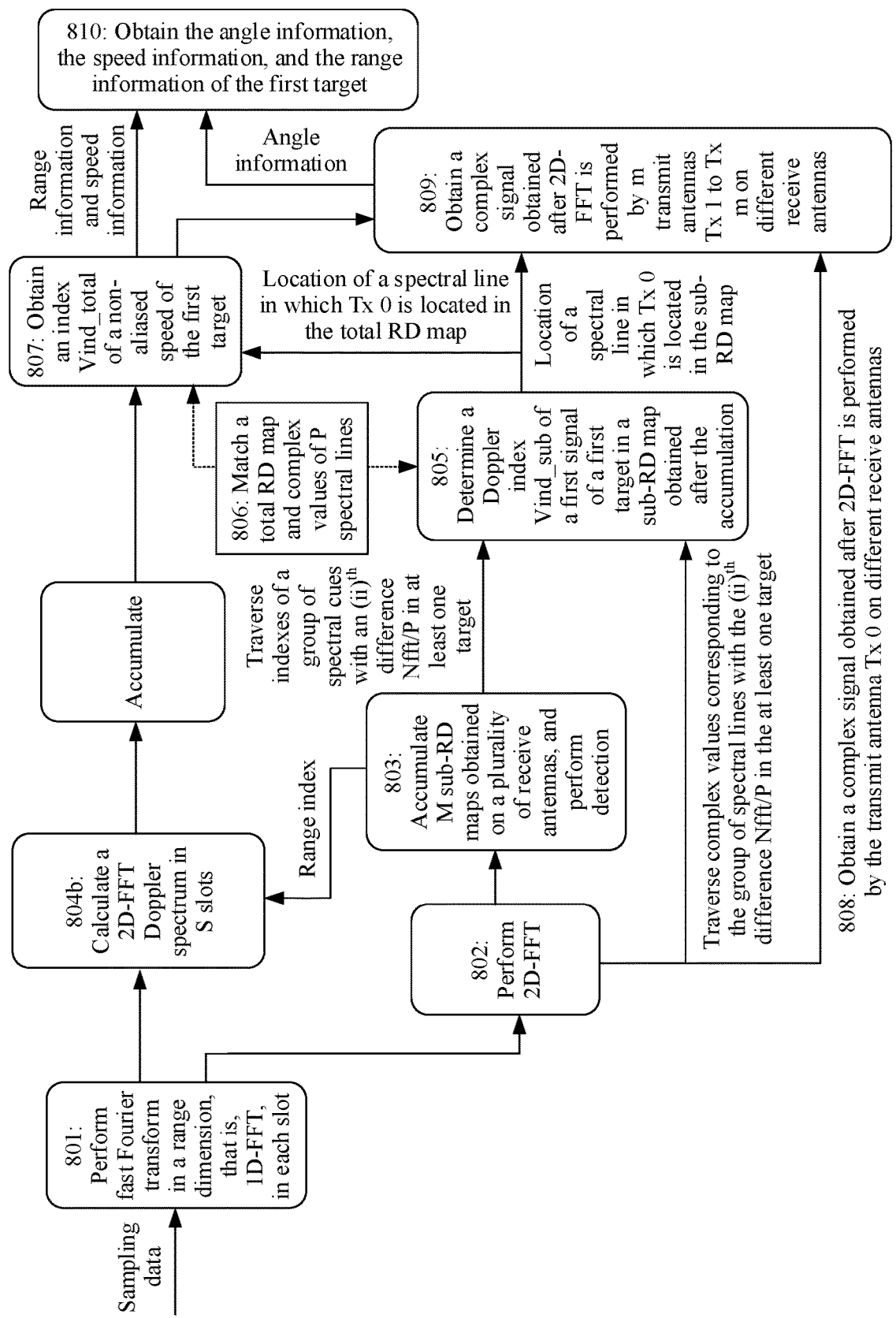
FIG. 9 is a schematic diagram of another radar signal receiving procedure according to an embodiment of this application.

Further, to simplify calculation, as shown in FIG. 9, step 804a may be replaced with step 804b: Calculate a 2D-FFT Doppler spectrum in the S slots on the range index Rind of the detected first target in the sub-RD map.

To determine Doppler in an echo signal formed after the first signal is reflected by the target, a plurality of different types of processing may be performed in cooperation with a transmit waveform.

Step 805: Determine at least one Doppler index Vind_sub of an aliased speed of a first signal of the first target in the sub-RD map obtained after the accumulation, that is, obtain a Doppler index Vind_sub of Tx 0 in the sub-RD map obtained after the accumulation. The Doppler index Vind_sub of the first signal of the first target in the sub-RD map obtained after the accumulation is located at one of P possible locations at an interval of Nfft/P, where Nfft is a dimension of 2D-FFT of the sub-RD map obtained after the accumulation.

A Doppler value in the sub-RD map is extracted from the range index Rind of the first target for detection, that is, threshold detection is performed on a Doppler domain, to obtain a speed of the first target in an aliased Vmax/M range, or at least one Doppler index Vind_sub of the aliased speed of the first signal.

However, because signals of different antennas are modulated by a phase of $2\pi k_y/P$, phase modulation is performed in $k_y=0, 1, \ldots,$ or P−1. The at least one Doppler index Vind_sub of the aliased speed of the first signal of the first target in the sub-RD map obtained after the accumulation cannot be directly obtained, but is located in P spectral lines at an interval of Nfft/P, where the P spectral lines include Vind, nfft/P+Vind, . . . , and (P−1)Nfft/P+Vind, Nfft is a dimension of 2D-FFT of the sub-RD map obtained after the accumulation, and Vind is a target index value detected in a range of [1, Nfft/P]. Actually, because the Doppler spectrum has a 21 cycle characteristic, any sub-range of P sub-intervals in the sub-RD map obtained after the accumulation may also be specifically detected herein. For example, if Vind in an interval of [Nfft/P+1, 2Nfft/P] is selected, locations of the corresponding P spectral lines are Vind-Nfft/P, Vind, . . . , and (P−2)Nfft/P+Vind.

Embodiments of this application provide a plurality of methods for determining a spectral line location of a spectral line Tx 0. One method is the method in step 805, and only information about the M sub-RD maps is used. In another method, a total RD map and a sub-RD map may be used. For details, refer to step 806.

In the method in step 805, only the M sub-RD maps are used. Specifically, amplitude differences between pairs of spectral lines corresponding to P spectral lines in each of M sub-RD maps of a same receive antenna are compared. A sub-RD map corresponding to a pair of spectral lines with a small amplitude difference is a spectral line location at which Tx 0 is located, that is, a Doppler index corresponding to the antenna Tx 0 in the sub-RD map is determined.

Because spectral lines in which Tx 1 to Tx m are located correspond to different channels, an amplitude difference is large. Because spectral lines in which Tx 0 is located correspond to a same channel, an amplitude difference is small. Therefore, a location of the spectral line in which Tx 0 is located may be determined based on the amplitude difference. Tx 1 to Tx m are respectively m transmit antennas that send the second signal.

Step 806: Extract complex values of P spectral lines in each sub-RD map one by one, where the P spectral lines are P spectral lines whose Doppler index values are Vind, Nfft/P+Vind, . . . , and (P−1)Nfft/P+Vind in the sub-RD map, and match the total RD map and the complex values of the P spectral lines, to determine a speed of the first target and a corresponding speed of Tx 0 in the sub-RD map obtained after the accumulation, where Vind is a target index value detected in a range of [1, Nfft/P].

It should be noted that, in this step, both a corresponding spectral line of Tx 0 in the sub-RD map obtained after the accumulation and a corresponding spectral line of Tx 0 in the total RD map may be determined. In other words, both the speed of the first target and the corresponding speed of Tx 0 in the sub-RD map obtained after the accumulation are determined.

Because the speed has a direction, that is, far away from a radar or close to a radar, in an actual process, Vind may be set to a positive number or a negative number to indicate whether the target is far away from or close to the radar. Herein, a maximum speed measurement range Vmax_total that is of a radar apparatus and that is determined based on a transmit waveform parameter is usually in a form in which two speed directions of being close to and far away from the radar are represented as positive and negative, that is, ±Vmax_total=λ/(4*$T_{SIMO}$), where k is a wavelength of a modulation frequency, and $T_{SIMO}$ is a slot length of a single continuous transmit antenna, and in this application, is denoted as a repetition period of sending a signal through a transmit antenna Tx 0. The transmit antenna Tx 0 is a transmit antenna that sends the first signal. The first target is any one of at least one target. The second signal is extracted at an interval of M slots, and +Vmax_sub=λ/(4*M*$T_{SIMO}$), where k is a wavelength of a modulation frequency. Therefore, a Doppler index value of the antenna Tx 0 determined on the sub-RD map further needs to be converted into a speed index value in a range of Vmax. A Doppler index Vind_total of a non-aliased speed of the first target is equal to Vind_sub+kk*Nfft-Nfft/2, where kk represents an aliasing value of M Doppler indexes obtained after down-sampling because the sub-RD map is each of the total RD map, and a value of kk is 0, . . . , or M−1. It should be noted that herein, an fftshift operation is performed on Vind_sub in the sub-RD map by using −Nfft/2, indicating positive and negative speeds, and an fftshift operation may be performed on Vind_total in the total RD map to obtain positive and negative speeds. Because different applications have different positive and negative speed definitions, this is not limited in this embodiment of this application.

Specifically, a quantity of targets on the range bin is obtained by using the sub-RD map, and a spectral line with maximum energy on a same range bin in the total RD map, that is, the Doppler index Vind_total of the non-aliased speed of the first target, matches a location of a Doppler index Vind_sub=mod(Vind_total, Nfft)+Nfft/2 of an aliased speed in the sub-RD map. The spectral line and the quantity of targets are iterated in sequence based on a quantity.

In total transmission time, only a signal of Tx 0 is always transmitted. Therefore, in the total RD map, energy of a spectral line of Tx 0 of a target is higher than energy of spectral lines of other transmit antennas of a same target.

FIG. 10(*a*) to FIG. 10(*c*) each show an example of a Doppler spectrum corresponding to three transmit antennas. In FIG. (a) to FIG. 10(*c*), in S slots, a modulation phase of a second signal includes P phases, and each transmit antenna that sends the second signal performs repeated sending by using P*M slots as a period. For example, P=2 and M=2. A total of S=256 slots are transmitted, Nfft=S/2=128, and a real speed is 0. FIG. 10(*a*) shows a Doppler spectrum of all slots, that is, a total RD map. FIG. 10(*b*) shows a Doppler spectrum corresponding to a slot 1 and a slot 3. FIG. 10(*c*) shows a Doppler spectrum corresponding to a slot 2 and a slot 4. In FIG. 10(*a*), in the total RD map, on a corresponding target range bin Rind, a corresponding Doppler spectral line may have one spectral line each at before and left a Doppler index Vind_total=129 (an identifier of Nfft/P=128/2=64) of a non-aliased speed. That is, a target can be detected at both 129−64=65 and 129+65=184. That is, a Doppler value of the detected target is large.

In FIG. 10(*b*), a Doppler spectrum of an odd slot has one spectral line each at 1 and 65. In FIG. 10(*c*), a Doppler spectrum of an even slot has one spectral line each at 1 and 65. In this case, it can be learned that a location of a spectral line of Tx 0 in the sub-RD map is a Doppler index Vind_sub=mod(129, Nfft=128)+Nfft/2=65 of an aliased speed, instead of a case in which the index is 1.

It can be learned with reference to FIG. 10(*a*) to FIG. 10(*c*) that, when P=2, an interval between spectral lines has the following rule: There is a spectral line at a left-right interval Nfft/2 of a real Doppler index Vind, that is, Vind_total+Nfft/2 or Vind_total-Nfft/2, and other spectral lines are at a left-right integer multiple Nfft interval. In addition, it may be understood that, even if there is only a Doppler speed of one target, a second signal sent in a time division manner and a code division manner forms a plurality of Doppler spectral lines. If according to a method in the conventional technology, the total RD map is used to detect that there are (P−1)*M+1 Doppler spectral lines corresponding to one target, it is very difficult to directly detect an aliased speed of one target on Tx 0 on the total RD map. When a speed measurement range of the sub-RD map is reduced to 1/M of the total RD map, P spectral lines with a large amplitude difference in an Nfft/P relationship always exist, and a quantity of spectral lines in the sub-RD map does not increase as a quantity of transmit antennas of the second signal increases, and is related only to a quantity of different values of a phase modulation step $k_y$ used in phase modulation. Therefore, when the at least one Doppler index Vind_sub of the aliased speed of the target is determined by using the sub-RD map, only P spectral lines with a large amplitude need to be matched, which is far less than a quantity of Doppler spectral lines that need to be matched in the total RD map.

Step 807: Match the total RD map based on a Doppler index Vind_sub of an aliased speed of Tx 0 in the sub-RD map obtained after the accumulation, to obtain a Doppler index Vind_total of a non-aliased speed of the first target.

Specifically, the Doppler index Vind_sub of the non-aliased speed of Tx 0 obtained by using the sub-RD map obtained after the accumulation and the formula Vind_total=Vind_sub+kk*Nfft-Nfft/2 traverse different values of kk, to find a Doppler index value with a maximum amplitude in a possibility corresponding to the total RD map, so as to obtain the Doppler index Vind_total of the non-aliased speed of the first target, where kk is an aliased speed coefficient, and values of kk are 0, 1, . . . , and M-1. The process is similar to a reverse process in step 806. The non-aliased speed of the first target is speed information of the first target.

Figure 10A:
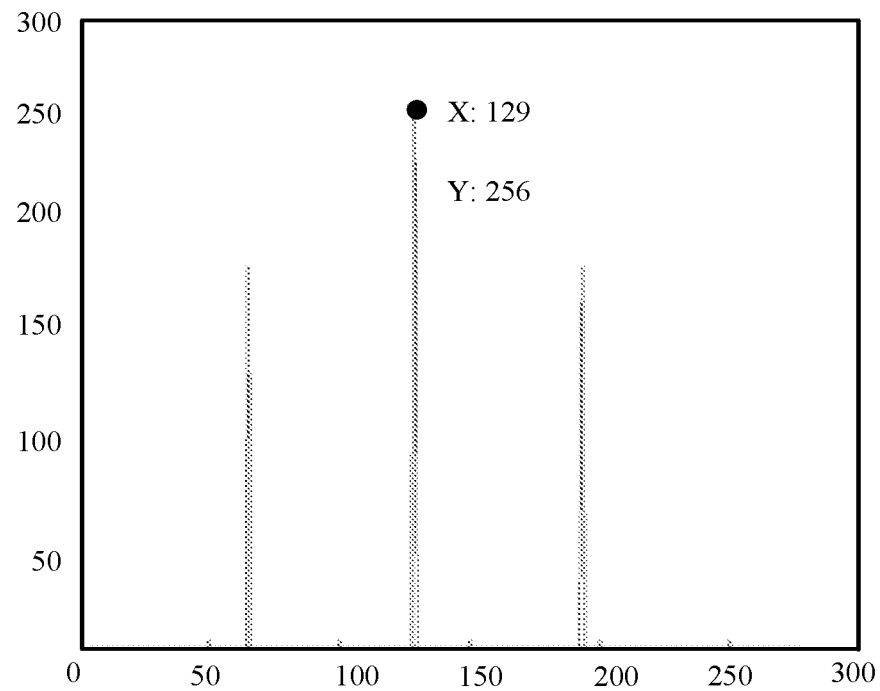
FIG. 10(a) to FIG. 10(c) are a schematic diagram of a Doppler spectral line according to an embodiment of this application.
Figure 10B:
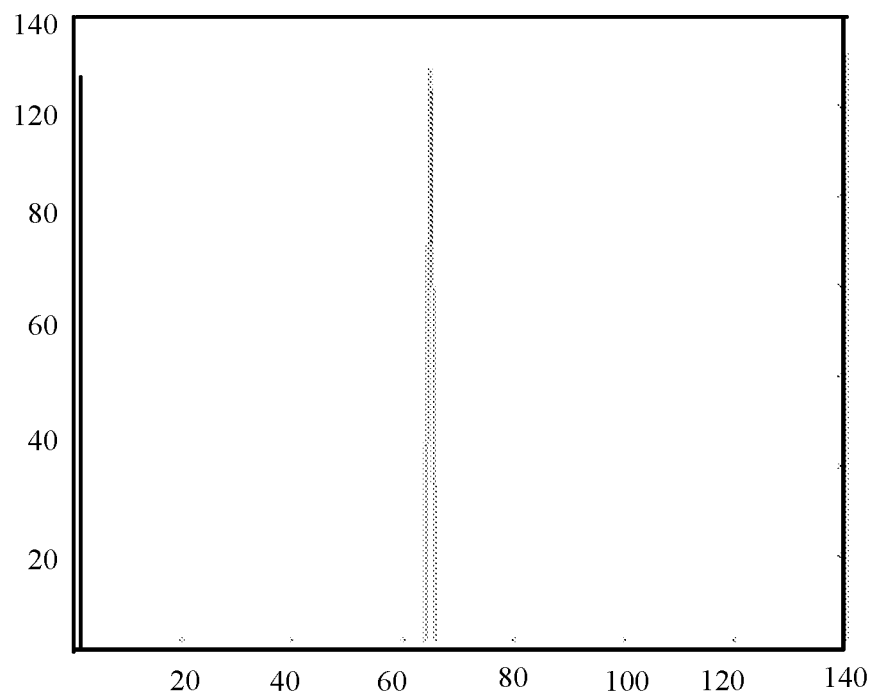
Figure 10C:
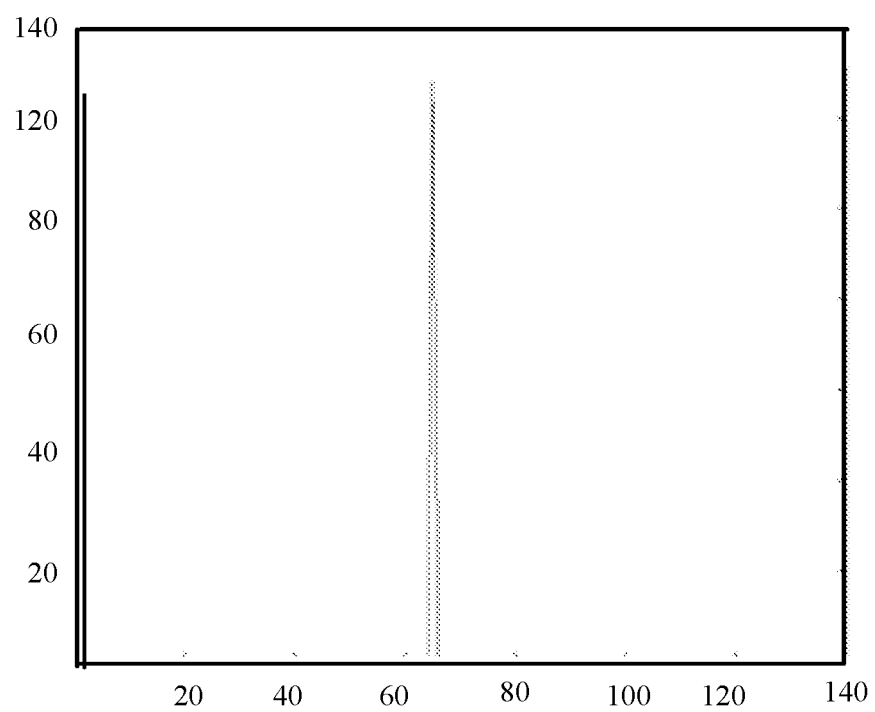

As shown in FIG. 10(a) to FIG. 10(c), actually, a Doppler index Vind_sub of an aliased speed of Tx 0 on the sub-RD map is equal to 65, a Doppler index Vind_total of a non-aliased speed is equal to 129, and kk=1. Therefore, it may also be known that, when kk=0, Vind_total=65−64=1. In the total RD map, a value on a Doppler spectral line whose index is Vind_total=1 is far lower than energy of Vind_total=129. Therefore, it may also be determined that kk=1, instead of being equal to 0. It should be noted that a value of kk herein is a value of 0, . . . , or M−1, and there is also a manner of representing a value of kk in a positive or negative interval. This is not particularly limited in this embodiment of this application.

Steps 805 to 807 are repeatedly performed based on a plurality of range bins in which the at least one detected target is located until traversal is completed.

The following steps may be further included.

Step 808: Obtain a complex signal obtained after 2D-FFT is performed by the transmit antenna Tx 0 on different receive antennas.

It may be understood that, the complex signal is extracted from an RD cell corresponding to range indexes Rind of M sub-RD maps of Nrx receive antennas and a Doppler index Vind_sub of an aliased speed.

Step 809: Compensate for a Doppler phase deviation caused by time division of the m transmit antennas Tx 1 to Tx m and a phase deviation caused by code division of the m transmit antennas Tx 1 to Tx m to obtain a complex signal obtained after 2D-FFT is performed by the m transmit antennas Tx 1 to Tx m on different receive antennas.

It should be noted that, m=0, 1, . . . , or M−1. For a $1^{st}$ slot, when m is set to 0, there is only a Doppler phase deviation caused by time division or a phase deviation caused by code division. When m is set to another value, a Doppler phase deviation caused by time division and a phase deviation caused by code division exist.

Because a transmit antenna in an $m^{th}$ slot is selected, a phase that needs to be compensated may be represented by a function of Vind_sub or Vind_total. Herein, $f(V_{ind\_total})$ represents a complex value of an RD cell whose index of 2D-FFT is (Rind, Vind_total) in the total RD map if the antenna is aligned with a transmission moment and a phase of Tx 0, and $f(V_{ind\_sub})$ represents a complex value of an RD cell whose index is (Rind, Vind_sub) in an $m^{th}$ sub-RD map if an antenna modulated by using a phase of $$2\pi \frac{k_m}{P}$$

transmits, in the $m^{th}$ slot, a signal whose aliased speed coefficient is kk.

$$f(V_{ind\_total}) = f(V_{ind\_sub})\exp\left(-j2\pi\frac{kk*m}{M}\right)\exp\left(-j2\pi\frac{k_m}{P}\right)$$

A phase compensation amount introduced by a transmit antenna in a TDM time division slot m and an aliased speed coefficient is $$\exp\left(-j2\pi\frac{kk*m}{M}\right),$$

and a change caused by phase modulation is $$\exp\left(-j2\pi\frac{k_m}{P}\right),$$

where $k_m$ is a value of k in a phase modulation step used by a transmit waveform used by a transmit antenna in the slot m.

In this step, a Doppler phase shift between different slots of each target is calculated, so that a separated complex signal of each receiving antenna can be obtained after phase compensation.

Specifically, there may be two methods.

Method 9-1: Determine Doppler compensation values of a transmit antenna at different moments based on a phase difference between phases of spectral lines in which Tx 0 is located in N−1 sub-RD maps.

Because the spectral line in which Tx 0 is located has only a phase introduced due to different moments in different sub-RD maps, this phase is used as a compensation value to compensate for other antennas using time division, so that signals are equivalent to simultaneous transmission. That is, it is equivalent to the part $$\exp\left(-j2\pi\frac{kk*m}{M}\right)$$

in the formula.

Method 9-2: Compensate a corresponding phase difference to Doppler compensation values of the transmit antenna at different moments based on the obtained Doppler phase of the first target.

Because a transmit antenna in an $m^{th}$ slot is selected, a phase that needs to be compensated may be represented by Vind_sub or Vind_total.

Step 810: Obtain angle information of the first target based on compensated signals on virtual receive antennas formed by different transmit antennas and receive antennas.

An antenna obtained by combining a transmit antenna and a receive antenna is a virtual receive antenna, or may be described as a virtual receive array obtained by combining a transmit antenna and a receive antenna. The angle information of the first target is obtained based on deployment of the virtual receive antenna by using FFT, digital beamforming (DBF), multiple signal classification (MulMUSIC), another commonly-used angle spectrum analysis algorithm, or the like. Details are not described herein.

It should be noted that, in step 810, range information and speed information that are determined in step 807 may be further obtained.

It should be noted that steps 808 to 810 are repeatedly performed on the first target output in step 807.

Figure 11:
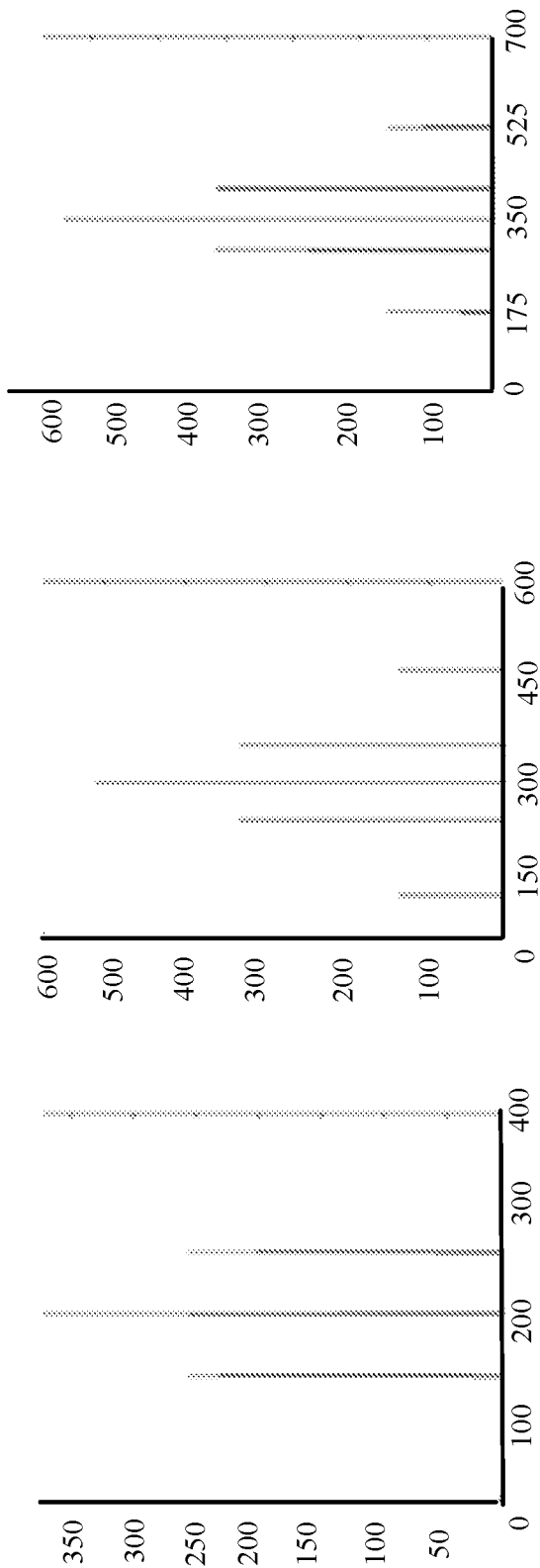
FIG. 11 is a schematic diagram of a Doppler spectral line according to an embodiment of this application.

It should be noted that this application may be further applied to a case in which a quantity of transmit antennas is larger. For example, FIG. 11 is a schematic diagram of a Doppler spectral line in which one range bin includes one target in a total RD map. On a leftmost total RD map in FIG. 11, four transmit antennas require at least six slots, and the total RD map includes four spectral lines. On a middle total RD map in FIG. 11, five transmit antennas require at least eight slots, and the total RD map includes five spectral lines. On a rightmost total RD map in FIG. 11, six transmit antennas require at least 10 slots, and the total RD map includes six spectral lines. Another case is not described. It can be learned from this figure that if a target is detected in the total RD map, because of periodic extension of an antenna speed of discontinuous transmission, even if only P different steps are selected for the phase, it is difficult to detect a plurality of spectral lines. Therefore, in this method, the target is detected by using the sub-RD map, so that processing on a receive side can be simplified.

Figure 12:
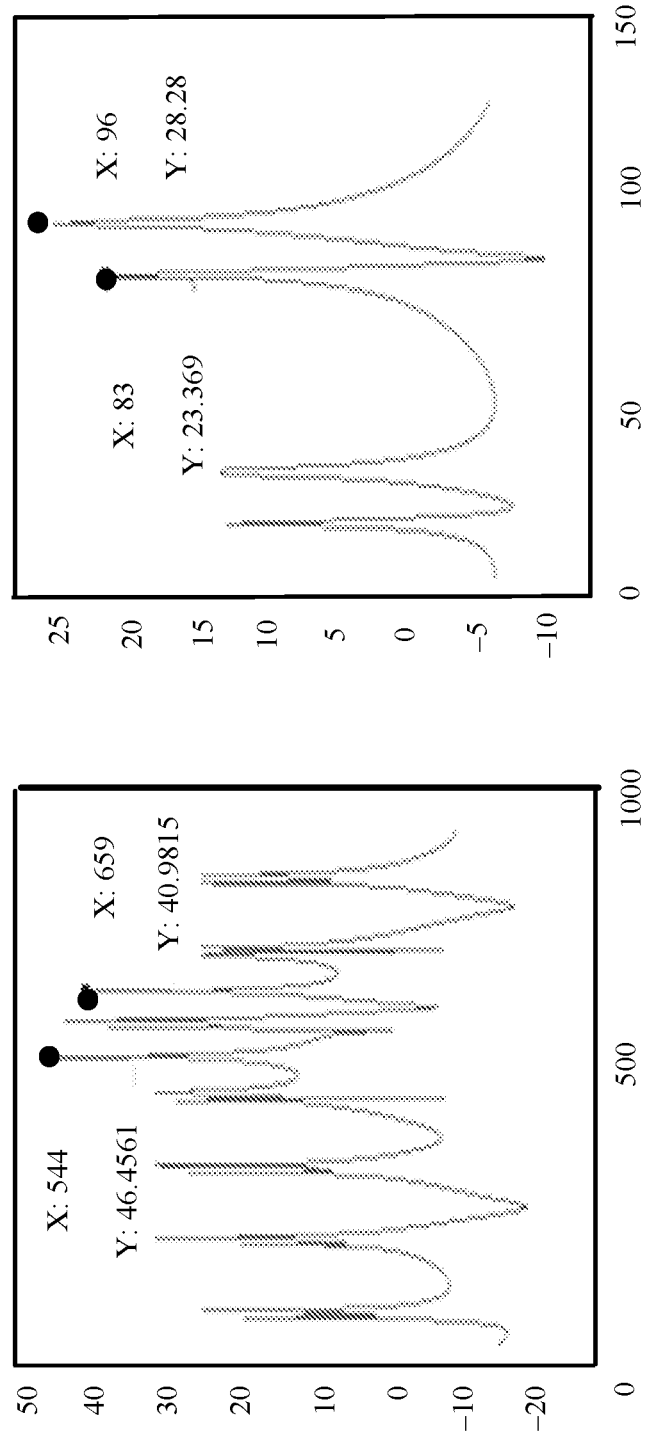
FIG. 12 is a schematic diagram of a Doppler spectral line according to an embodiment of this application.

Further, when M=8, m=8, N=9, P=2, S=1024, and Nfft=1024/8=128, there are two target scenarios, that is, two indexes Vind_sub are detected on Rind. FIG. 12 is a schematic diagram in which one range bin includes two target Doppler spectral lines in a total RD map of binary phase 16 slots. In FIG. 12, speed resolution of each of the total RD map and the sub-RD map is dv, but a speed measurement range of the total RD map is $8*2*64*dv=1024*dv$. In this case, a speed measurement range of the sub-RD map is $2*64*dv=128*dv$.

In the sub-RD map, it is detected that a peak index Vind of Tx 0 on a Doppler domain is equal to 96 or 83, and an interval between two peaks in the sub-RD map is 13.

In the total RD map, a Doppler index $544=96+128*3+64$ of a first largest peak is obtained by using a local peak method. Therefore, it is found that $544*dv$ is a speed of the first target. Because an interval between two peaks in the sub-RD map is 13, a Doppler index of a second peak in the total RD map does not meet an integer aliasing relationship of the interval, and $96-83=(544-659)+2*128$ is matched on a Doppler index 659 whose amplitude is a third largest peak. Therefore, a speed of a second target is $659*dv$.

Actually, an example herein is a case in which a same range index Rind corresponds to two targets. However, this embodiment of this application is not limited thereto. A plurality of iterations may be performed until a matched peak value is less than a predetermined threshold.

Further, a Doppler phase difference caused by different moments is compensated based on a speed, and a Doppler phase difference between different antennas is compensated according to Method 9-1 or Method 9-2.

Further, signals of antennas that are transmitted at different moments after compensation are transmitted at a same moment, and a phase difference on the antenna is only a phase difference caused by a delay in space of the antenna. Angle information of a target is calculated based on the phase difference. Because the calculation herein is related to deployment of the antenna, this is not specifically limited herein.

Further, with reference to Embodiment 2, when a third signal is further included in the S0 slots after the S slots, corresponding steps performed on the receive side are the same except step 806. For details, refer to the foregoing descriptions.

With reference to Embodiment 2, step 806 may be implemented in the following manner:

When the m transmit antennas further send the third signal in the S0 slots, a Doppler location of Tx 0 in the sub-RD map may be determined by comparing a location of a spectral line in the S slots and a location of a spectral line in the S0 slots, that is, a Doppler index Vind_sub of an aliased speed and a Doppler index Vind_total of a non-aliased speed corresponding to a real speed of a target.

Figure 13:
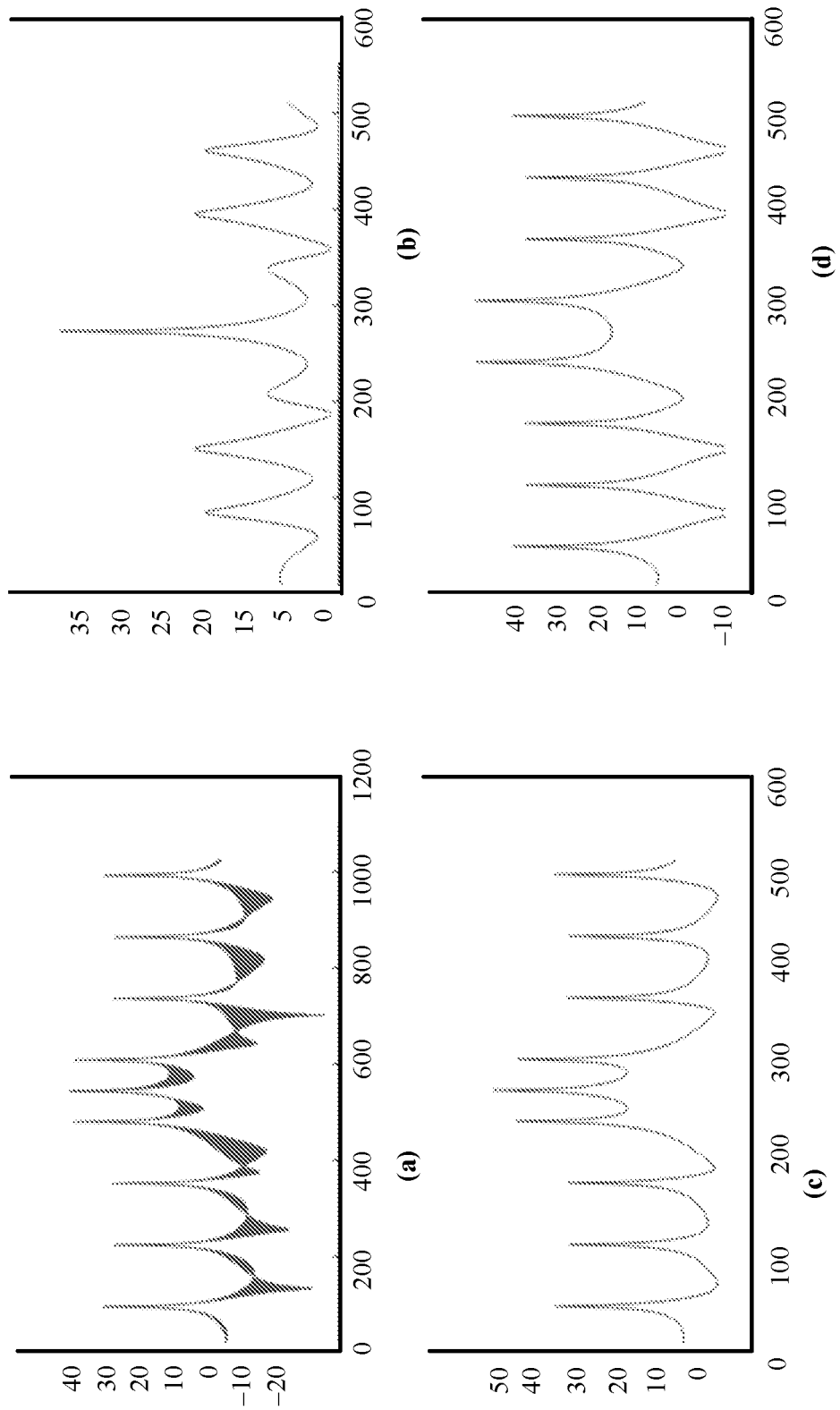
FIG. 13 is a schematic diagram of a Doppler spectral line according to an embodiment of this application.

Specifically, it is assumed that m=8, N=9, M=8, P=2, S=S0=512, and transmit antennas are respectively Tx 0 to Tx 8. Tx 0 sends a first signal, and Tx 1 to Tx 8 send a second signal and a third signal. A Doppler spectrum is calculated for a signal in first S slots in a corresponding range bin. FIG. 13 is a schematic diagram of a Doppler spectral line according to an embodiment of this application. In (c) in FIG. 13 (a lower left figure in FIG. 13), a total of nine spectral lines, a signal sent through Tx 0, and a plurality of aliased spectral lines that appear on spectral lines of other Tx 1 to Tx 8 due to time division may be obtained. If a Doppler spectrum is calculated based on range bins corresponding to signals in subsequent S0 slots, eight spectral lines may be obtained. For details, refer to (d) in FIG. 13 (a lower right figure in FIG. 13). Because no signal of Tx 0 exists, a plurality of aliased spectral lines appear on spectral lines only in Tx 1 to Tx 8 due to time division. In this case, a spectral line location corresponding to the speed of the target at 256 may be obtained by subtracting the two spectral amplitudes. For details, refer to (b) in FIG. 13 (an upper right figure in FIG. 13). (a) in FIG. 13, that is, an upper left figure in FIG. 13, shows a Doppler spectral line obtained by performing FFT on entire S+S0 slots.

Because a sum of duration of the second signal and duration of the third signal is larger than duration of the first signal, the signal sent through Tx 0 occupies only first S slots, and the signal sent through Tx 1 to Tx 8 occupy S+S0 slots. Therefore, actually, speed resolution obtained by Tx 0 is lower than that obtained by Tx 1 to Tx 8, that is, $dv\_tx0=S*dv\_txi/(S+S0)$, where dv_tx0 and dv_txi respectively represent speed resolution corresponding to Tx 0, and an actual target speed and a Doppler phase corresponding to the target speed may be obtained through simple conversion. Details are not described herein.

Further, with reference to Embodiment 3, when P is greater than 2, specific steps on the receive side are the same except step 806 and step 809. The following separately describes step 806 and step 809.

Step 806: When P=4, extract spectral lines of Vind, Nfft/4+Vind, Nfft/2+Vind, and 3*Nfft/4+Vind in the sub-RD map, and determine a location of a spectral line that is in the sub-RD map and in which Tx 0 is located, that is, the Doppler index Vind_sub of the aliased speed.

It should be noted that, in this case, information about a plurality of transmit antennas in the total RD map is also difficult to be identified by relying on Doppler. Phases of transmit antennas Tx 1, Tx 2, and Tx 3 that simultaneously transmit signals in a same group are $f0-(2*\pi*ii+Q)/(2*\pi*M*T_{SIMO})$, where f0 is a frequency of the signal transmitted through Tx 0. When M=N−1=2 and P=4, Q has three possible values, that is, $\pi/2$, $\pi$, or $3\pi/2$. Phase 0 is occupied by Tx 0, and ii has two possible values 0 and 1. There are a total of $2*3=6$ possible spectral lines, and there are a total of seven spectral lines in addition to the spectral line in which Tx 0 is located, as shown in the first figure on the left of FIG. 11. Therefore, in this embodiment, the spectral line in which Tx 0 is located may be obtained by using auxiliary target information of the sub-RD map.

Specifically, in Method 1, only the sub-RD map is used, that is, step 805*a* is performed. Amplitude differences between P=4 spectral lines in a plurality of sub-RD maps are compared, and the spectral line in which Tx 0 is located has a smaller amplitude difference.

In the plurality of sub-RD maps, all channels except a channel of Tx 0 are time-division channels. Therefore, amplitudes differ greatly. In FIG. 11, amplitudes of Vind=129 in the sub-RD map are all 256, and a location of the spectral line in which Tx 0 is located is 129.

In Method 2, the total RD map and the sub-RD map are used, that is, step 806 is performed. A quantity of targets on the range bin is obtained by using the sub-RD map, and a spectral line with maximum energy on a same range bin in the total RD map, that is, the Doppler index Vind_total of the non-aliased speed, matches a location of mod(Vind_total, Nfft)+Nfft/2 of an aliased speed in the sub-RD map. The spectral line and the quantity of targets are iterated in sequence based on a quantity, to determine the location of the spectral line in which Tx 0 is located.

Figure 14:
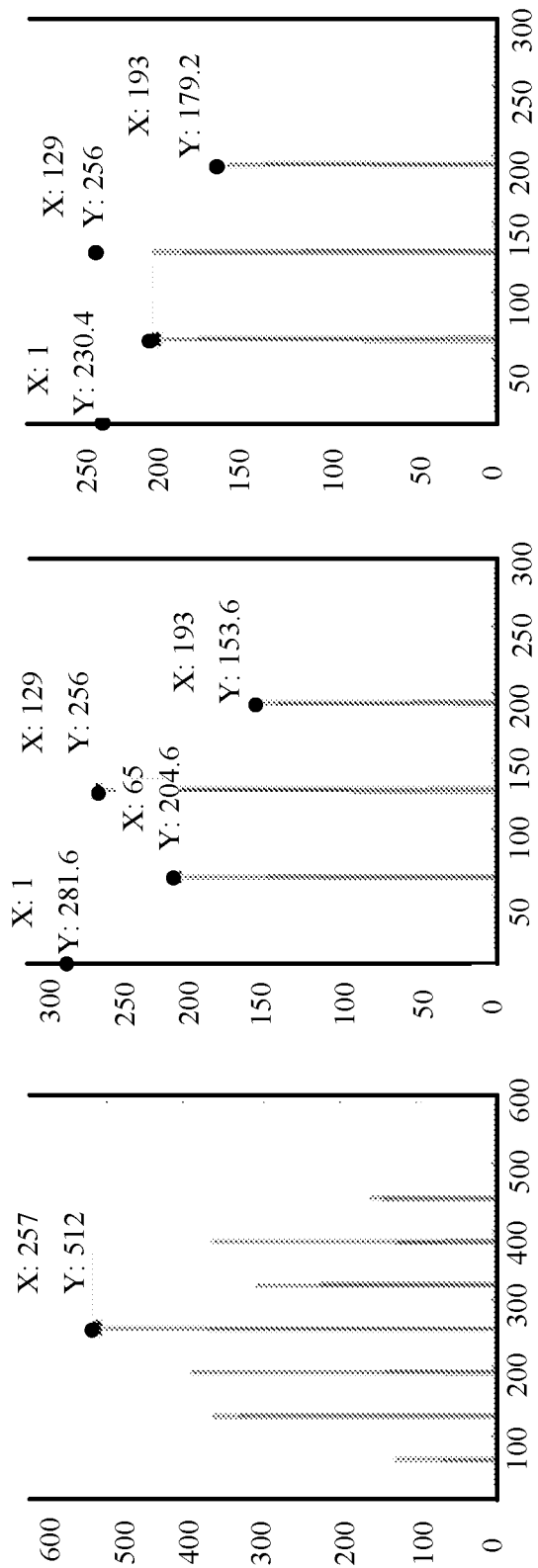
FIG. 14 is a schematic diagram of a Doppler spectral line according to an embodiment of this application.

FIG. 14 is a schematic diagram of a Doppler spectral line according to an embodiment of this application. For example, FIG. 14 shows Doppler spectral lines in a total RD map and a sub-RD map of one target in a range bin with four phases and eight slots. In FIG. 14, descriptions are provided by using an example in which a total radial speed is 0 and there is only one target in a 0-degree direction. There are seven spectral lines at an interval of Nfft/4=64 in the total RD map. Each target has four spectral lines at an interval of 64 in the sub-RD map. Energy of a Doppler index Vind_total=257 of a non-aliased speed of the first target is highest, and mod(257, 256)+256/2=129. It may be determined that a location 129 of the Doppler index is a spectral line of Tx 0.

Further, step 809: Compensate for Doppler frequency differences of slots in which Tx 1 to Tx m are located, and fixed phase differences j, −1, and −j between Tx 0 and Tx 1 to Tx m, and obtain a complex signal obtained after 2D-FFT is performed by the antennas Tx 1 to Tx m on different receive antennas.

Similarly, the example in Embodiment 3 may also be extended to a case in which M is set to another value, for example, N≤(P−1)*M+1. Phases of different antennas in a same group (that is, antennas that occupy a same slot for sending) are different, and locations of silent periods in different groups are cyclically shifted.

Further, when M is set to another value and P≥3, a quantity of transmit antennas for simultaneously transmission in at least one group (antennas for simultaneous transmission in a same slot) of the second signal is less than P−1.

Correspondingly, on the receive side, step 805 may be shown as follows:

Step 805*b* is an alternative solution of step 805*a*, and only a method for determining a Doppler identifier of Tx 0 in the sub-RD map is used. Similar to the conventional technology, in Embodiment 2, when P≥3, if only some phases in a set are used as step modulation signals in a group (antennas for simultaneous transmission in a same slot), an identifier of Tx 0 may be identified by using a vacant phase. Alternatively, when P=2, and M is greater than an integer of m/(P−1), P phase modulation steps are not fully occupied in some sub-RD maps. Therefore, a location of a Doppler spectral line in which Tx 0 is located may be identified by using a vacant phase in a sub-RD map, that is, a Doppler index Vind_sub of an aliased speed.

Specifically, in an example in which there are P=4 phases, phases that are of a signal sent based on the first signal in each period and that are in P slots at an interval of M in P*M slots may be represented as [1, 1, 1, 1], and phases that are of a signal sent based on the second signal in each period and that are in P slots at an interval of M in P*M slots may be selected from [1, j, −1, −j], [1, −1, 1, −1], and [1, −j, −1,j]. When simultaneous transmission is performed by using less than 4−1=3 (P=4) transmit antennas, for example, transmission is performed by using only [1, j, −1, −j] and [1, −j, −1, j], a spectral line of f0-fvmax/2 does not exist, and therefore a correct location of Tx 0 may be determined by using this method. That is, spectral lines exist only in f0, f0-fvmax/4, and f0-3fvmax/4. In M groups of antennas using time division multiplexing, provided that some groups are used for transmission in this manner, the location of the spectral line in which Tx 0 is located can be determined on the receive side by using the sub-RD map of the corresponding slot. Similarly, when P=4, M=2, m=5, N=m+1=6, Tx 1 to Tx 3 occupy slots 1 and 3, and Tx 4 and Tx 5 occupy slots 2 and 4, only signals of three transmit antennas exist in the slots 2 and 4, that is, signals of the antennas Tx 0, Tx 4, and Tx 5. Based on a phase modulation step and a vacant phase, that is, one of P evenly distributed spectral lines is missing, a spectral line of f0-fvmax/2 does not exist.

Alternatively, it may be understood that when P=2 and M>m/(P−1)=m, m signals in the second signal do not occupy all of the S slots, and only the first signal exists in some slots. For example, when P=2, N=3, and m=N−1=2, M=3. In this case, it is assumed that Tx 1 occupies slots 1 and 4, Tx 2 occupies slots 2 and 5, only the first signal, that is, the signal of Tx 0, exists in slots 3 and 6, and a location of a spectral line in which the second signal is located is vacant. The location of the spectral line in which Tx 0 is located may be determined by using the sub-RD map corresponding to the slots 3 and 6.

Figure 15:
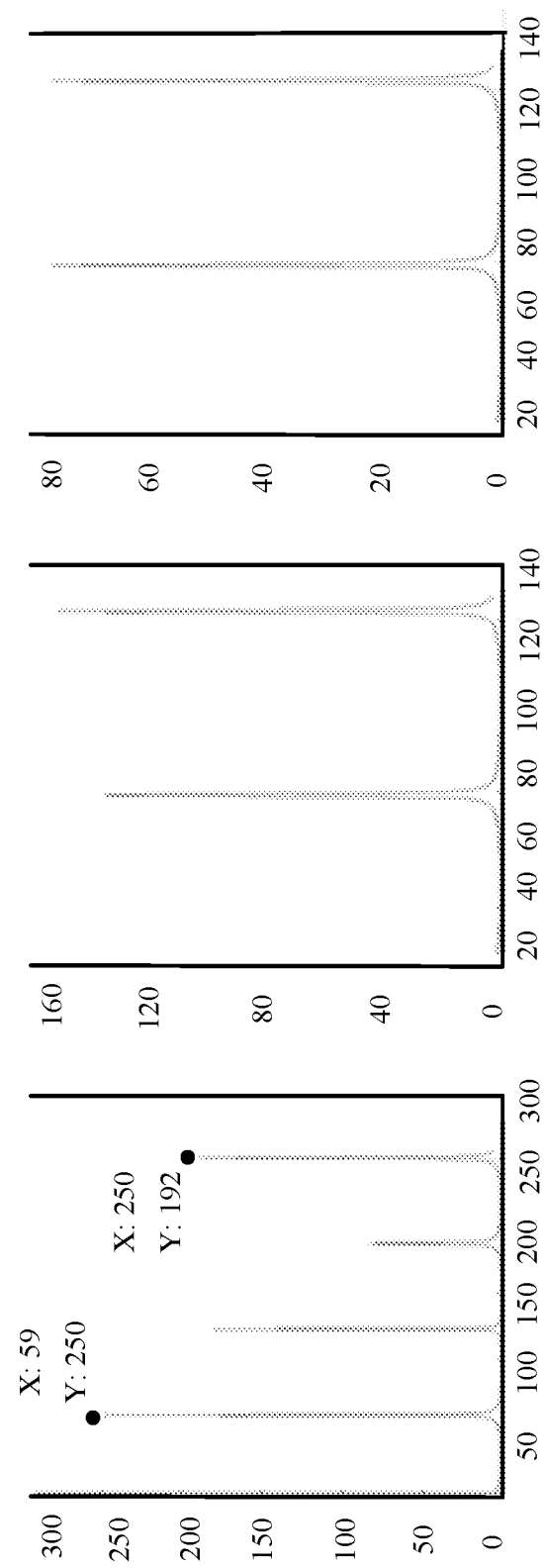
FIG. 15 is a schematic diagram of a Doppler spectral line according to an embodiment of this application.
Figure 16:
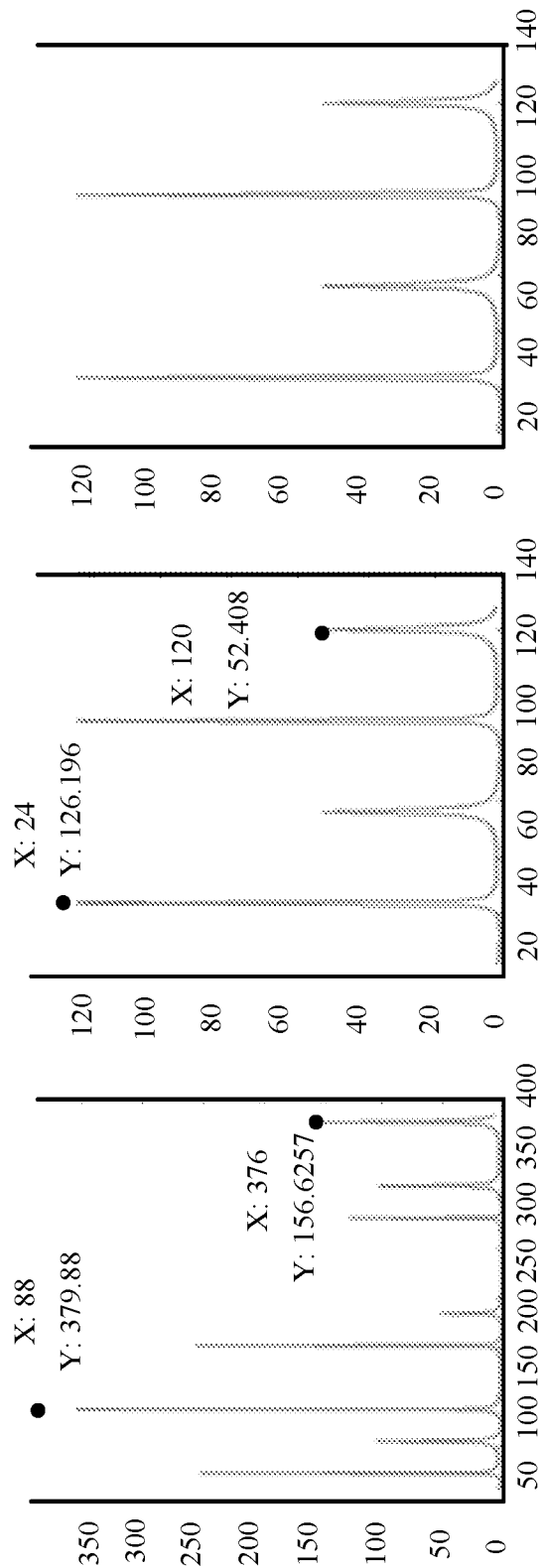
FIG. 16 is a schematic diagram of a Doppler spectral line according to an embodiment of this application.

Further, currently, in some special cases, only one pair of spectral lines can be observed on the sub-RD map, but it can be observed from the total RD map that there are actually two target speeds. For example, FIG. 15 is a schematic diagram of Doppler spectral lines in a total RD map and a sub-RD map of an overlapping target in two sub-RD maps in a range bin with two phases and four slots. In FIG. 16, corresponding speeds are Vind=59 and Vind=251, and Tx 0 of two corresponding targets in the sub-RD map are respectively on a left spectral line and a right spectral line. Therefore, a weak target, for example, a target whose speed is Vind=251, may be missed.

To resolve this problem, the signal sending method in Embodiment 4 may be used, that is, the m transmit antennas in the second signal are grouped into different groups, and different $M_i$ or $m_i$ is selected for each group. With reference to Embodiment 4, when the m transmit antennas send the second signal in the S slots by using different configurations, on the receive side, step 803, step 806, and step 809 may be different in the following aspects.

Step 803: Extract a plurality of sub-RD maps respectively based on M1 and M2.

For example, when M1=2 and M2=3, FIG. 16 is a schematic diagram of a Doppler spectral line according to an embodiment of this application. For example, FIG. 16 is a schematic diagram of Doppler spectral lines in a total RD map and a sub-RD map of a Doppler overlapping target in four slots in two sub-RD maps in a range bin with two phases and six slots.

With reference to FIG. 16, speed identifiers of different configurations are converted by using $d_{vM2}=M1*d_{vM1}/M2$. Specifically, because M2=3, and a maximum speed measurement range is a single chirp scanning time, speed resolution $d_{v6}$ in six slots and speed resolution $d_{v4}$ in four slots may have the following conversion relationship: $d_{v6}=4*d_{v4}/6=M1*d_{v4}/M2$.

Step 806: Determine, based on a plurality of sub-RD maps with different configurations and a total RD map, a spectral line in which Tx 0 is located.

Different from Embodiment 1, in this embodiment, a largest quantity of targets in the plurality of sub-RD maps is used as a target quantity. For example, in a sub-RD map in which M1=2, it is determined that there is only one target, but in a sub-RD map in which M2=3, it is determined that there are two targets. In this case, spectral lines in which Tx 0 of the two targets is located need to be separately searched for. Specifically, locations of spectral lines in which Tx 0 of a plurality of targets are further determined in steps 805 and 806.

Based on a waveform configuration on a transmit side, it is easily learned whether Tx 0 of the plurality of targets is aliased to one of same or different P locations on a current range index Rind.

Step 809: Compensate for a Doppler frequency difference between slots in which Tx 1 to Tx m are located.

Figure 17:
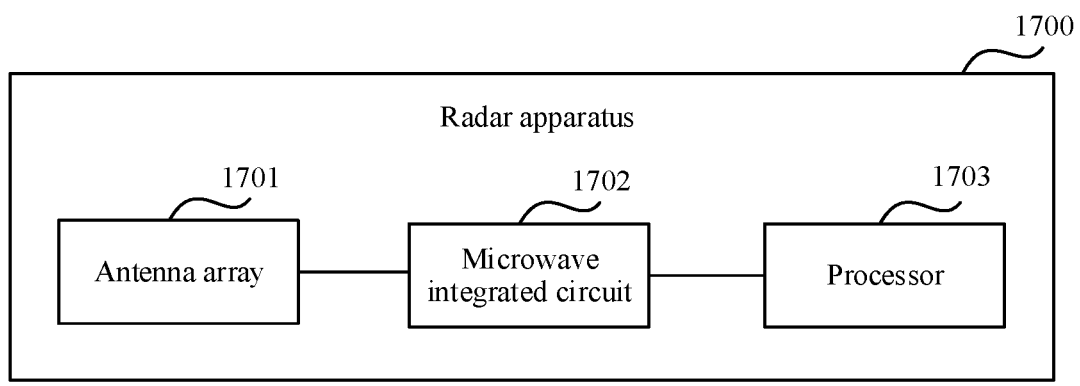
FIG. 17 is a schematic diagram of a structure of a radar apparatus according to an embodiment of this application.

N1 transmit antennas and N2 transmit antennas send signals in a time division manner. When designed total transmission duration of N1 and N2 meets a requirement that the target moves at a maximum speed and does not exceed one range bin, targets reflected by the signals sent through the N1 transmit antennas and the N2 transmit antennas are still in one range bin. Therefore, only a phase difference may be considered. In a vehicle-mounted scenario, it may be considered that total duration of S1 slots in which the N1 transmit antennas send signals does not exceed 10 ms, and total duration of S2 slots in which the N2 transmit antennas send signals does not exceed 10 ms. An embodiment of this application further provides a radar apparatus. The radar apparatus may be configured to perform the method shown in FIG. 3. Refer to FIG. 17. The radar apparatus includes an antenna array 1701, a microwave integrated circuit 1702, and a processor 1703. The antenna array 1701 includes N transmit antennas, where N is an integer greater than 2.

The processor 1703 is configured to: determine a first signal and a second signal.

The microwave integrated circuit 1702 is configured to generate the first signal and the second signal that are determined by the processor 1703.

The antenna array 1701 is configured to: send the first signal in S slots through one of the N transmit antennas, where a phase of the first signal remains unchanged in the S slots; and send the second signal in the S slots through m transmit antennas in the N transmit antennas in at least one of a time division manner or a code division manner, where S is an integer greater than or equal to 4, and m is an integer greater than 2 and less than N; and phase modulation is performed, by using a step of $2\pi k_y/P$, on a signal that is in the second signal and that is sent through each of the m transmit antennas, where P is an integer greater than 1, $k_y$ is an integer greater than 0 and less than P, $k_y$ represents a phase modulation step used by a $y^{th}$ transmit antenna in the m transmit antennas, and y=1, . . . , or m.

Optionally, (Nd+1)*P*M>S>=Nd*P*M, where Nd represents a quantity of repetition times of transmission patterns of the m transmit antennas, and Nd is greater than or equal to 1.

The transmission pattern indicates that a signal of a transmit antenna using a time division manner occupies P non-conflicting slots at an interval of M slots, where M is a quantity of slots separated between adjacent slots in slots occupied by one of the m transmit antennas, and M is an integer greater than or equal to m/(P−1).

Optionally, values of $k_y$ are different when phase modulation is performed, by using a step of $2\pi k_y/P$, on signals sent through transmit antennas that occupy a same slot in the m transmit antennas.

Optionally, the microwave integrated circuit is further configured to send a third signal in S0 slots after the S slots through the m transmit antennas in a time division manner, where S0 is an integer greater than 1; and a transmission pattern of the third signal in the S0 slots is the same as a transmission pattern of the second signal in the S slots, where S=Nd*P*M, and M is an integer greater than or equal to m/(P−1).

Optionally, m=N1+N2, N1>=2, and N2>=1. The microwave integrated circuit is specifically configured to:

in first S1 slots in the S slots, separately send the second signal through N1 transmit antennas in the m transmit antennas by using P*M1 slots as a period and by selecting P non-conflicting slots at an interval of M1 from P*M1 slots in one period; and in last S2 slots in the S slots, separately send the second signal through N2 transmit antennas other than the N1 transmit antennas in the m transmit antennas by using P*M2 slots as a period and by selecting P non-conflicting slots at an interval of M2 from P*M2 slots in one period, where S=S1+S2, M1≠M2, M1>=N1/(P−1), and M2>=N2/(P−1).

Optionally, P=2, 3, or 4.

Optionally, the m transmit antennas that send the second signal and the one transmit antenna that sends the first signal are different transmit antennas in the N transmit antennas.

Figure 18:
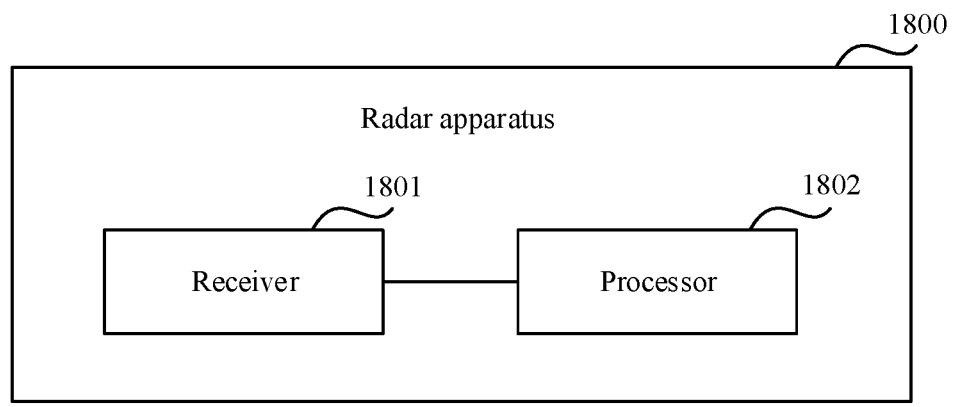
FIG. 18 is a schematic diagram of a structure of a radar apparatus according to an embodiment of this application.

An embodiment of this application further provides a radar apparatus. The radar apparatus may be configured to perform the method shown in FIG. 7. Refer to FIG. 18. The radar apparatus 1800 includes a receiver 1801 and a processor 1802, and the receiver includes at least one receive antenna.

The receiver is configured to receive an echo signal, where the echo signal is formed after a first signal and a second signal are reflected by at least one target; the first signal is sent in S slots through one of N transmit antennas, and a phase of the first signal remains unchanged in the S slots; the second signal is sent in the S slots through m transmit antennas in the N transmit antennas in at least one of a time division manner and a code division manner, where m is an integer greater than or equal to 2 and less than N; phase modulation is performed, by using a step of $2\pi k_y/P$, on a signal that is in the second signal and that is sent through each of the m transmit antennas, where P is an integer greater than 1, $k_y$ is an integer greater than 0 and less than P, $k_y$ represents a phase modulation step used by a $y^{th}$ transmit antenna in the m transmit antennas, and y=1, . . . , or m; and S is an integer greater than or equal to 4.

The processor is configured to: obtain M sub-range-Doppler RD maps of each of the at least one receive antenna, where an $i^{th}$ sub-RD map in the M sub-RD maps of each receive antenna is a result of performing two-dimensional fast Fourier transform 2D-FFT on signals at an interval of M slots that are in echo signals of the receive antenna in the S slots and whose start slots are respectively i, and i is set to any integer of 1, 2, ..., and M; and detect a first target based on the sub-RD map obtained after the M sub-RD maps of each receive antenna are accumulated, and obtain range information of the first target, where the first target is one or more of the at least one target.

Optionally, the processor is further configured to obtain a corresponding total range-Doppler RD map, where the total RD map is a result of performing 2D-FFT in all adjacent slots in the S slots.

Optionally, the processor is further configured to determine at least one Doppler index Vind_sub of an aliased speed of a first signal of the first target on the sub-RD map obtained after the accumulation, where the at least one Doppler index Vind_sub of the aliased speed of the first signal of the first target on the sub-RD map obtained after the accumulation is located at P possible locations at an interval of Nfft/P, and Nfft is a dimension of 2D-FFT of the sub-RD map obtained after the accumulation.

Optionally, the processor is further configured to match the sub-RD map obtained after the accumulation and the total RD map to determine at least one Doppler index Vind_total of a non-aliased speed of the first target and at least one Doppler index Vind_sub of an aliased speed corresponding to the first target on the sub-RD map obtained after the accumulation.

Optionally, the processor is further configured to: compensate for a Doppler phase deviation caused by time division of the m transmit antennas and a phase deviation caused by code division of the m transmit antennas, and obtain angle information of the first target.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A radar signal transmitting method, applied to a radar apparatus, wherein the radar apparatus comprises N transmit antennas, N is an integer greater than 2, and the method comprises:
    sending a first signal in S consecutive slots through a first transmit antenna of the N transmit antennas, and S is an integer greater than or equal to 4; and
    sending a second signal in the S consecutive slots through m transmit antennas in the N transmit antennas except the first transmit antenna in at least one of a time division manner or a code division manner, wherein m is an integer greater than or equal to 2 and less than N, wherein
    phase modulation is performed, by using a step of $2\pi k_y/P$, on a signal that is sent through each of the m transmit antennas, wherein P is an integer greater than 1, $k_y$ is an integer greater than 0 and less than P, $k_y$ represents a phase modulation parameter used by a $y^{th}$ transmit antenna in the m transmit antennas, and y=1, ..., or m.

2. The method according to claim 1, wherein the m transmit antennas comprises a first antenna group and a second antenna group, and phase steps of signals transmitted by each antenna in the first antenna group are different, and signals transmitted by all antennas in the first antenna group occupy a same slot;
    phase steps of signals transmitted by each antenna in the second antenna group are different, and signals transmitted by all antennas in the second antenna group occupy a same timeslot; and
    the first antenna group and the second antenna group send signals in a time division manner.

3. The method according to claim 1, wherein a phase of the first signal remains unchanged in the S consecutive slots or a phase step of the first signal in an adjacent slot in the S consecutive slots is 0.

4. The method according to claim 1, wherein the second signal is modulated by setting a switch state and/or phase selection of a phase shifter.

5. The method according to claim 1, wherein (Nd+1)*P*M>S>=Nd*P*M, Nd represents a quantity of repetition times of transmission patterns of the m transmit antennas, and Nd is greater than or equal to 1; and
    a transmission pattern indicates that a signal of a transmit antenna using a time division manner occupies P non-conflicting slots at an interval of M slots, wherein M is a quantity of slots separated between adjacent slots among slots occupied by one of the m transmit antennas, and M is an integer greater than or equal to m/(P−1).

6. The method according to claim 1, wherein values of $k_y$ are different in response to phase modulation being performed, by using a step of $2\pi k_y/P$, on signals sent through transmit antennas that occupy a same slot in the m transmit antennas.

7. The method according to claim 1, wherein P phases obtained by using a step of $2\pi k_y/P$ are generated by a phase shifter comprising phases $[0, 2\pi/P, 4\pi/P, 6\pi/P, \ldots, (P-1)*2\pi/P]$.

8. The method according to claim 1, further comprising:
sending a third signal in S0 slots after the S slots through the m transmit antennas in a time division manner, wherein S0 is an integer greater than 1, wherein
a transmission pattern of the third signal in the S0 slots is the same as a transmission pattern of the second signal in the S slots, wherein S=Nd*P*M, and M is an integer greater than or equal to m/(P−1).

9. The method according to claim 1, wherein m=N1+N2, N1>=2, and N2>=1; and
wherein the sending the second signal in the S slots through the m transmit antennas in the N transmit antennas in the at least one of the time division manner or the code division manner comprises:
in first S1 slots in the S slots, separately sending the second signal through N1 transmit antennas in the m transmit antennas, by using P*M1 slots as a period and by selecting P non-conflicting slots at an interval of M1 from the P*M1 slots in one period; and
in last S2 slots in the S slots, separately sending the second signal through N2 transmit antennas other than the N1 transmit antennas in the m transmit antennas, by using P*M2 slots as a period and by selecting P non-conflicting slots at an interval of M2 from the P*M2 slots in one period, wherein $S=S1+S2, M1>=N1/(P-1), \text{ and } M2>=N2/(P-1)$.

10. The method according to claim 1, wherein a signal waveform of the first signal in the S slots is a frequency modulated continuous wave (FMCW); and
a signal waveform of the second signal in the S slots is an FMCW.

11. The method according to claim 1, wherein P=2, 3, or 4.

12. An apparatus comprising N transmit antennas, wherein N is an integer greater than 2,
wherein a first transmit antenna of the N transmit antennas is configured to send a first signal in S consecutive slots, and S is an integer greater than or equal to 4; and
m transmit antennas in the N transmit antennas except the first transmit antenna are configured to send a second signal in the S slots in at least one of a time division manner or a code division manner, wherein m is an integer greater than or equal to 2 and less than N, wherein
phase modulation is performed, by using a step of $2\pi k_y/P$, on a signal that is sent through each of the m transmit antennas, wherein P is an integer greater than 1, $k_y$ is an integer greater than 0 and less than P, $k_y$ represents a phase modulation parameter used by a $y^{th}$ transmit antenna in the m transmit antennas, and y=1, ..., or m.

13. The apparatus according to claim 12, wherein the m transmit antennas comprises a first antenna group and a second antenna group, and phase steps of signals transmitted by each antenna in the first antenna group are different, and signals transmitted by all antennas in the first antenna group occupy a same slot;
phase steps of signals transmitted by each antenna in the second antenna group are different, and signals transmitted by all antennas in the second antenna group occupy a same timeslot; and
the first antenna group and the second antenna group send signals in a time division manner.

14. The apparatus according to claim 12, wherein a phase of the first signal remains unchanged in the S consecutive slots or a phase step of the first signal in an adjacent slot in the S consecutive slots is 0.

15. The apparatus according to claim 12, wherein the second signal is modulated by setting a switch state and/or phase selection of a phase shifter.

16. The apparatus according to claim 12, wherein (Nd+1)*P*M>S>=Nd*P*M, Nd represents a quantity of repetition times of transmission patterns of the m transmit antennas, and Nd is greater than or equal to 1; and
a transmission pattern indicates that a signal of a transmit antenna using a time division manner occupies P non-conflicting slots at an interval of M slots, wherein M is a quantity of slots separated between adjacent slots among slots occupied by one of the m transmit antennas, and M is an integer greater than or equal to m/(P−1).

17. The apparatus according to claim 12, wherein values of $k_y$ are different, in response to phase modulation being performed, by using a step of $2\pi k_y/P$, on signals sent through transmit antennas that occupy a same slot in the m transmit antennas.

18. The apparatus according to claim 12, wherein P phases obtained by using a step of $2\pi k_y/P$ are generated by a phase shifter comprising phases $[0, 2\pi/P, 4\pi/P, 6\pi/P, \ldots (P-1)*2\pi/P]$.

19. The apparatus according to claim 12, wherein the m transmit antennas are configured to:
send a third signal in S0 slots after the S slots in a time division manner, wherein S0 is an integer greater than 1, wherein
a transmission pattern of the third signal in the S0 slots is the same as a transmission pattern of the second signal in the S slots, wherein S=Nd*P*M, and M is an integer greater than or equal to m/(P−1).

20. The apparatus according to claim 12, wherein a signal waveform of the first signal in the S slots is a frequency modulated continuous wave (FMCW); and
a signal waveform of the second signal in the S slots is an FMCW.

21. The apparatus according to claim 12, wherein P=2, 3, or 4.

* * * * *